United States Patent
Akazawa

(10) Patent No.: US 11,134,172 B2
(45) Date of Patent: Sep. 28, 2021

(54) IMAGE FORMING APPARATUS WITH USER AUTHENTICATION BY NEAR FIELD WIRELESS COMMUNICATION

(71) Applicant: CANON KABUSHIKI KAISHA, Tokyo (JP)

(72) Inventor: Minoru Akazawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/062,154

(22) Filed: Oct. 2, 2020

(65) Prior Publication Data

US 2021/0127037 A1 Apr. 29, 2021

(30) Foreign Application Priority Data

Oct. 25, 2019 (JP) .............................. JP2019-194810

(51) Int. Cl.
*H04N 1/44* (2006.01)
*H04N 1/00* (2006.01)
*H04N 1/32* (2006.01)
*G06F 3/12* (2006.01)

(52) U.S. Cl.
CPC ....... *H04N 1/4433* (2013.01); *H04N 1/00307* (2013.01); *H04N 1/00342* (2013.01); *H04N 1/00411* (2013.01); *H04N 1/00424* (2013.01); *H04N 1/32101* (2013.01); *G06F 3/1238* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,068,244 | B2* | 11/2011 | Uejo | G06F 16/93 358/1.14 |
| 9,154,661 | B2 | 10/2015 | Akazawa et al. | H04N 1/00957 |
| 9,852,746 | B2 | 12/2017 | Nakashita et al. | G11B 5/024 |
| 2007/0013938 | A1* | 1/2007 | Itagaki | G06K 15/005 358/1.14 |
| 2009/0021777 | A1* | 1/2009 | Yamaguchi | G06Q 30/06 358/1.15 |
| 2009/0300757 | A1* | 12/2009 | Tanaka | G06F 21/608 726/20 |

(Continued)

FOREIGN PATENT DOCUMENTS

| | | |
|---|---|---|
| JP | 2015-103162 | 6/2015 |
| JP | 2019-155610 | 9/2019 |

*Primary Examiner* — Haris Sabah
(74) *Attorney, Agent, or Firm* — Venable LLP

(57) ABSTRACT

An image forming apparatus includes an information storing unit, an information acquiring unit and a control unit. On the basis of association between pieces of identification information stored in the storing unit and pieces of user information, the control unit authenticates the use of the image forming apparatus by a user corresponding to an associated piece of identification information. Upon acquisition by the acquiring unit, of a piece of identification information which is not stored in the storing unit, the controller unit causes a display portion to display display regions corresponding to pieces of user information so as to be selectable to cause the storing unit to store piece of identification information and a corresponding piece of user information in association with each other.

7 Claims, 17 Drawing Sheets

AUTHORIZED
USER LIST 800

| No. | USER NAME | PASSWORD | PORTABLE TERMINAL ID |
|---|---|---|---|
| 1 | 111111 | abab0101 | AAA·················AA |
| 2 | 222222 | xyzxyz2345 | BBB·················BB |
| 3 | 333333 | 9182hyjk | UNREGISTERED |
| 4 | 444444 | mnop313poqo | DDD·················DD |
| 5 | 555555 | 32jjkk414 | EEE·················EE |
| 6 | 666666 | lsk12keo | FFF·················FF |
| 7 | 777777 | ssiae3 | GGG·················GG |
| 8 | 888888 | pwmxo86 | HHH·················HH |
| 9 | 999999 | caoaow2 | III·················III |
| ⋮ | ⋮ | ⋮ | ⋮ |

(56) References Cited

U.S. PATENT DOCUMENTS

| | | | |
|---|---|---|---|
| 2013/0250354 A1* | 9/2013 | Kato | H04N 1/0044 358/1.15 |
| 2015/0096016 A1* | 4/2015 | Ren | G06F 21/608 726/20 |
| 2016/0124692 A1* | 5/2016 | Nakatsu | G06F 3/1207 358/1.15 |

* cited by examiner

AUTHORIZED
USER LIST 800

| No. | USER NAME | PASSWORD | PORTABLE TERMINAL ID |
|---|---|---|---|
| 1 | 111111 | abab0101 | AAA··················AA |
| 2 | 222222 | xyzxyz2345 | BBB··················BB |
| 3 | 333333 | 9182hyjk | UNREGISTERED |
| 4 | 444444 | mnop313poqo | DDD··················DD |
| 5 | 555555 | 32jjkk414 | EEE··················EE |
| 6 | 666666 | lsk12keo | FFF··················FF |
| 7 | 777777 | ssiae3 | GGG··················GG |
| 8 | 888888 | pwmxo86 | HHH··················HH |
| 9 | 999999 | caoaow2 | III··················III |
| ⋮ | ⋮ | ⋮ | ⋮ |

Fig. 10

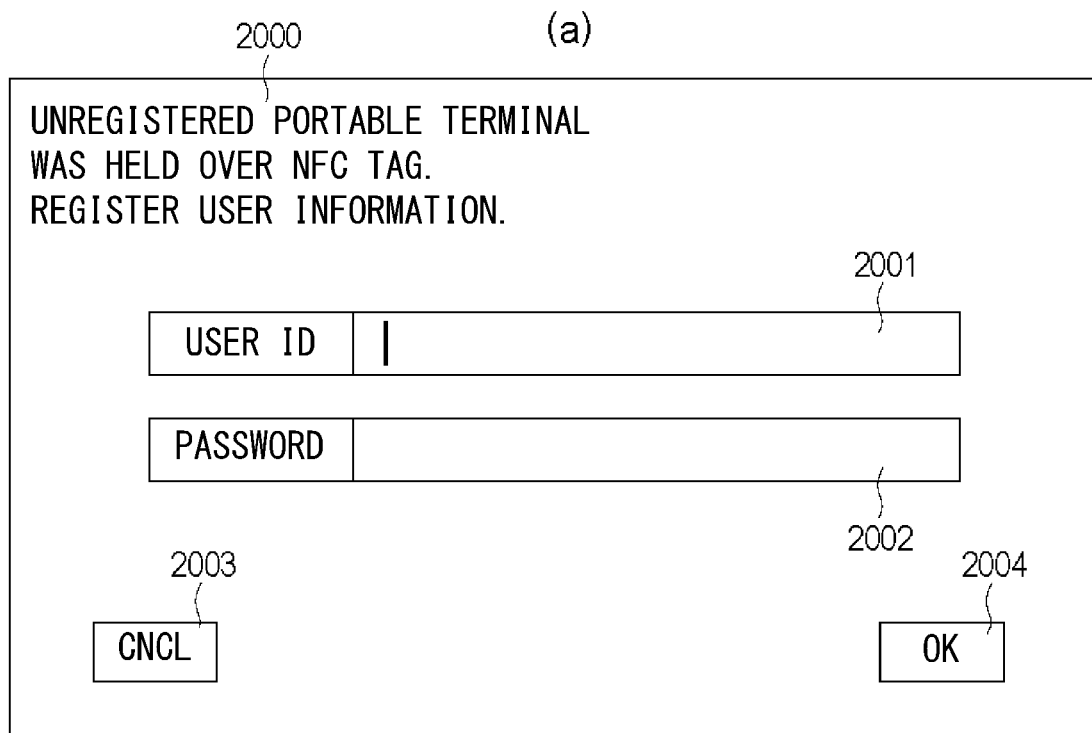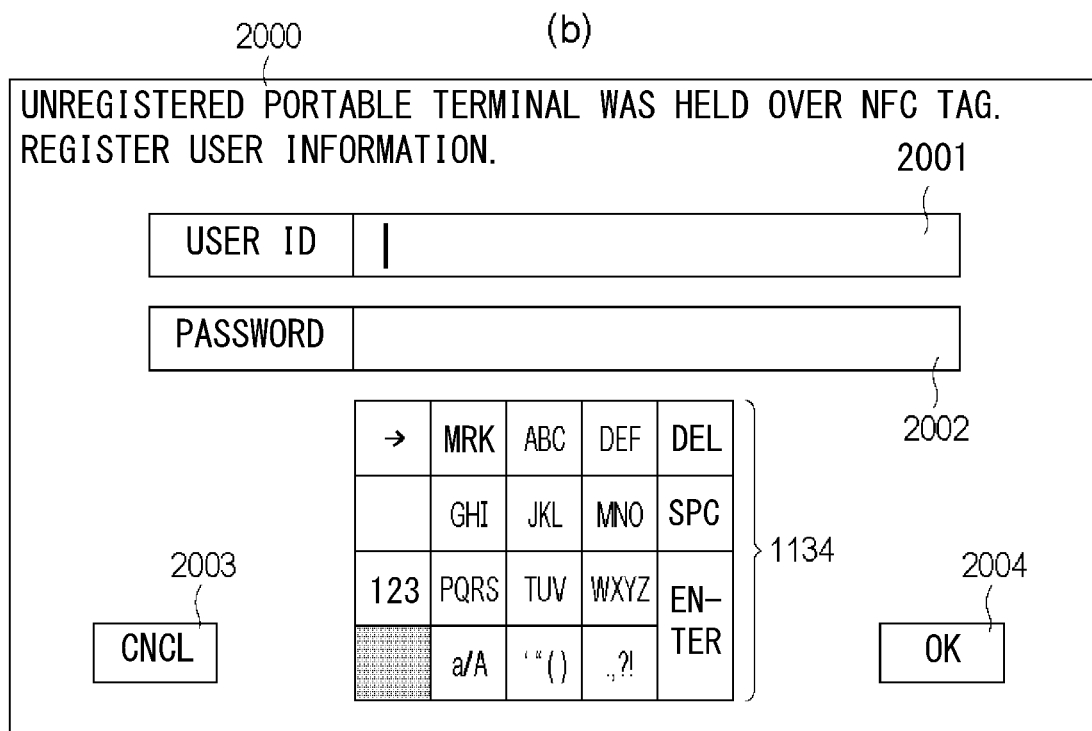
Fig. 11

(a)

| No. | USER ID | PASSWORD |
|---|---|---|
| 1 | 111111 | ******** |
| 2 | 222222 | ******** |
| 3 | 333333 | ******** |
| ⋮ | ⋮ | ⋮ |

93

(b)

| No. | USER ID | PASSWORD |
|---|---|---|
| 1 | 111111 | ******** |
| 2 | 222222 | ******** |
| 3 | 333333 | ******** |
| ⋮ | ⋮ | ⋮ |

93

(c)

| No. | USER ID | PASSWORD |
|---|---|---|
| ICHIRO OSAKA | 111111 | ******** |
| TARO TOKYO | 222222 | ******** |
| JIRO YAMADA | 333333 | ******** |
| ⋮ | ⋮ | ⋮ |

94

(d)

| No. | USER ID | PASSWORD |
|---|---|---|
| ICHIRO OSAKA | 111111 | ******** |
| TARO TOKYO | 222222 | ******** |
| JIRO YAMADA | 333333 | ******** |
| ⋮ | ⋮ | ⋮ |

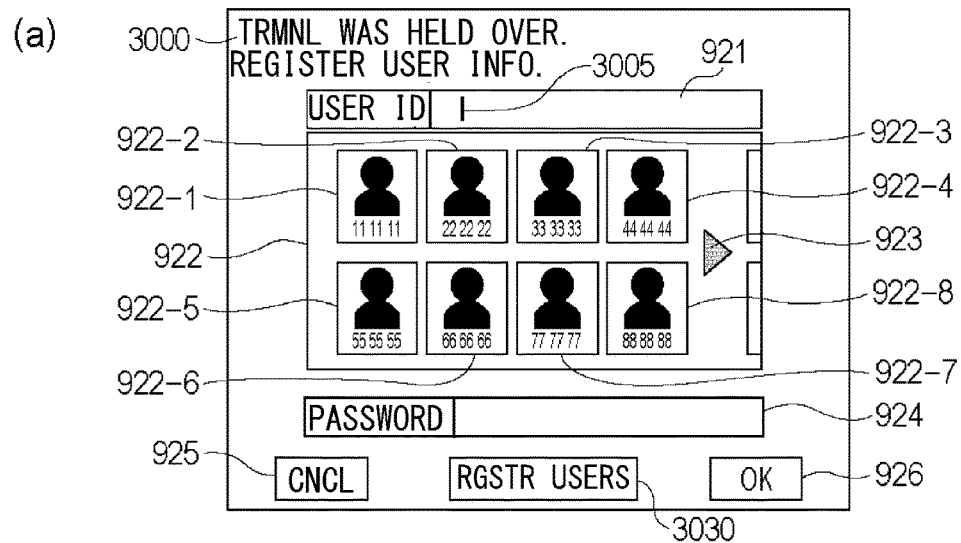
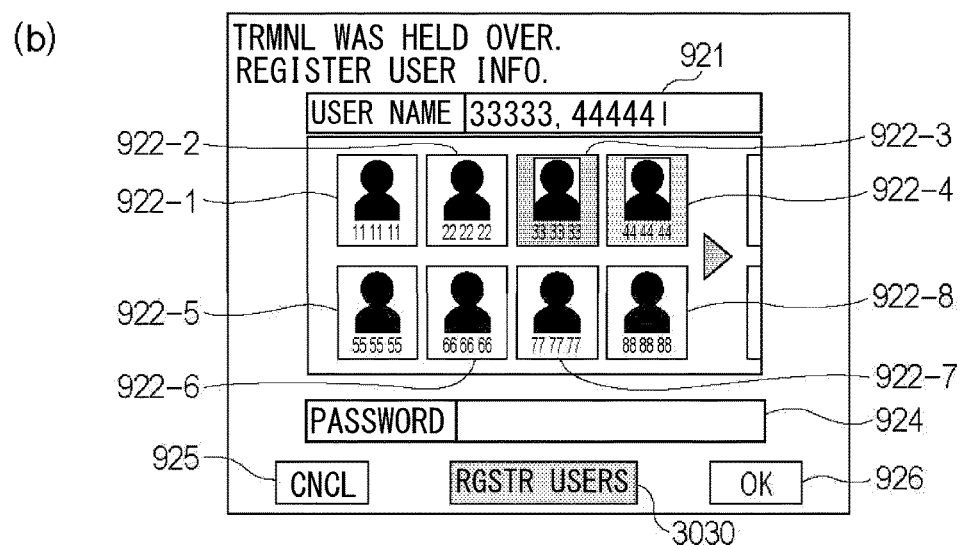
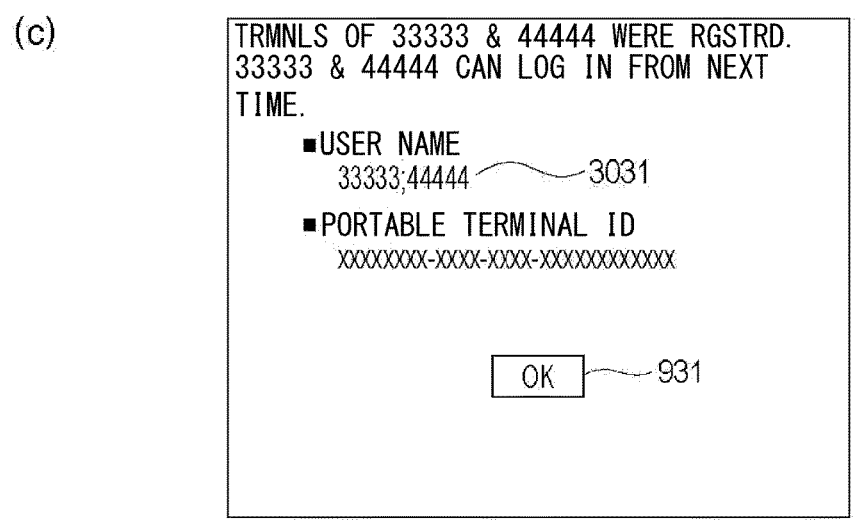
Fig. 16

IMAGE FORMING APPARATUS WITH USER AUTHENTICATION BY NEAR FIELD WIRELESS COMMUNICATION

FIELD OF THE INVENTION AND RELATED ART

The present invention relates to an image forming apparatus, such as a copying machine or a printer, capable of authenticating use of the image forming apparatus by a user by using identification information of a portable terminal or a biological information of the user.

For example, as in the case of a multi-function machine installed in an office, in the case where the image forming apparatus is shared and used by a plurality of users, a constitution in which only a person of a certain division (section) allowed (permitted) to use the multi-function machine can use the multi-function machine is employed in some instances. By employing such a constitution, it is possible to prevent use of the multi-function machine by a person of another division who is not allowed to use the multi-function machine. Conventionally, to the person (user) allowed to use the multi-function machine, pieces of user information (user ID and password) are distributed (assigned), and a means in which these pieces of user information are manually inputted to the multi-function machine during use and the person (user) legs in the multi-function machine has been taken.

In recent years, a login technique through near field wireless communication using a portable terminal such as a smartphone or an ID card has become widespread. As representative near field wireless communication, NFC (near field communication) exists. To the portable terminal, identification information for identifying the portable terminal individually is assigned. A user registers the identification information of the portable terminal in the multi-function machine in association with the portable terminal of the user himself/herself in advance. In response to holding of the portable terminal of the user himself/herself over the multi-function machine, the identification information of the portable terminal is transmitted to the multi-function machine by the near field wireless communication. The multi-function machine compares the identification information sent from the portable terminal with identification information of the portable terminal registered in advance in itself, and when the both pieces of identification information coincide with each other, the multi-function machine allows (permits) login of the user. When this method is used, if the user only performs an initial registration operation in advance in which user information registered in the multi-function machine is associated with the portable terminal of the user himself/herself, thereafter, the user is capable of saving time and effort such that the user manually inputs the user information every login (Japanese Laid-Open Patent Application (JP-A) 2015-103162).

Further, there is an image forming apparatus using, as the identification information, biological information such as finger print or iris. Similar to the login method using the above-described near field wireless communication, the user registers first the biological information of the user himself/herself in association with the user information registered in advance in the multi-function machine (JP-A 2019-155610).

Parts (a) and (b) of FIG. 11 are schematic views illustrating an initial registration operation for the purpose of registration such that the user registers the identification information of the portable terminal of the user himself/herself (or the biological information of the user) in association with the user information registered in a conventional image forming apparatus. As shown in parts (a) and (b) of FIG. 11, the user causes the multi-function machine to read the identification information of the portable terminal through the near field wireless communication and thereafter manually inputs user information (use ID and password in this case) of the user himself/herself. A CPU provided in the multi-function machine discriminates that the inputted user information exists as the user information which has already been registered in the multi-function machine and then allows authentication, and thereafter, registers the identification information of the portable terminal and the user information in association with each other. In the above-described manner, the initial registration operation is completed.

Thus, in the conventional image forming apparatus, in the case where identification information of an unregistered portable terminal (or biological information of unregistered user) is acquired, a screen for inputting a character string of the user information is displayed. The user performs input of the character string on this screen, so that authentication is allowed. However, an operation in which the user manually inputs the character string on such a screen is a troublesome work for the user, so that it was difficult to say that the operation is excellent in operativity.

SUMMARY OF THE INVENTION

According to an aspect of the present invention, there is provided an image forming apparatus capable of setting a mode in which use of the image forming apparatus including formation of an image on a sheet is allowed to a user by authenticating the user, the image forming apparatus comprising: a storing unit configured to store pieces of identification information assigned to portable terminals, respectively, and pieces of user information assigned to users, respectively, in association with each other; an acquiring unit configured to acquire the pieces of identification information assigned to the portable terminals to identify the portable terminals individually through an antenna configured to receive information by near field wireless communication from an associated one of the portable terminals positioned within a predetermined distance from the antenna; and a control unit, wherein (1) f on the basis of association between the pieces of identification information stored in the storing unit and the pieces of user information, the control unit authenticates the use of the image forming apparatus by the user corresponding to an associated piece of identification information, and (2) upon acquisition by the acquiring unit, of a piece of identification information which is not stored in the storing unit, the controller unit causes a display portion to display display regions corresponding to the pieces of user information so as to be selectable to cause the storing unit to store the piece of identification information and a corresponding piece of user information in association with each other.

According to another aspect of the present invention, there is provided an image forming apparatus capable of setting a mode in which use of the image forming apparatus including formation of an image on a sheet is allowed to a user by authenticating the user, the image forming apparatus comprising: a storing unit configured to store pieces of biological information of users and pieces of user information assigned to the users, respectively, in association with each other; an acquiring unit configured to acquire the pieces of biological information; and a control unit, wherein (1) on the basis of association between the pieces of biological information stored in the storing unit and the pieces of user information, the control unit authenticates the use of the image forming apparatus by the user corresponding to an associated piece of biological information, and (2) upon acquisition by the acquiring unit, of a piece of biological information which is not stored in the storing unit, the controller unit causes a display portion to display display regions corresponding to the pieces of user information so as to be selectable to cause the storing unit to store the piece of biological information and a corresponding piece of user information in association with each other.

Further features of the present invention will become apparent from the following description of exemplary embodiments with reference to the attached drawings.

Figure 7:
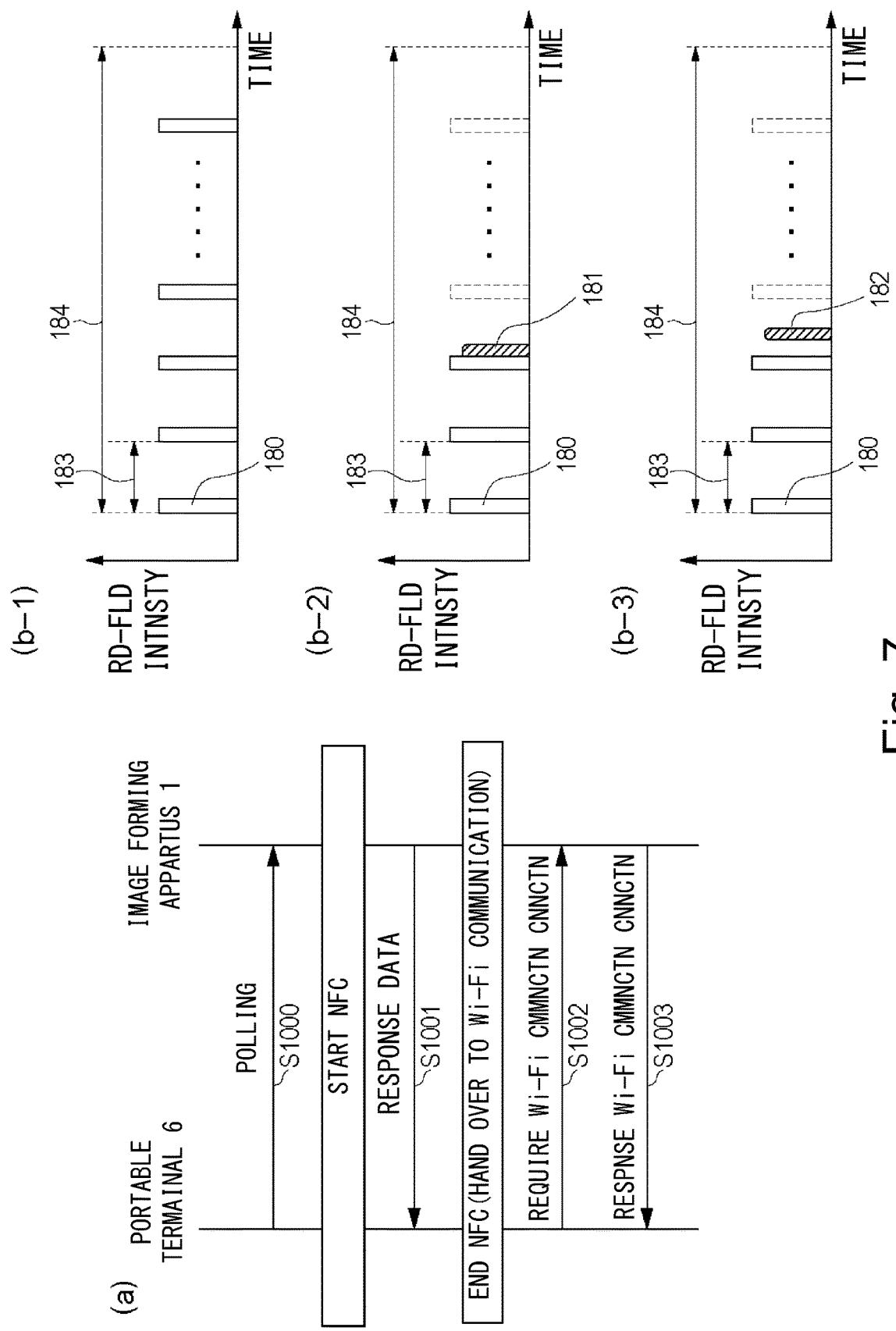

Parts (a) and (b-1) to (b-3) of FIG. 7 are schematic views for illustrating NFC and Wi-Fi communication.

Figure 8:
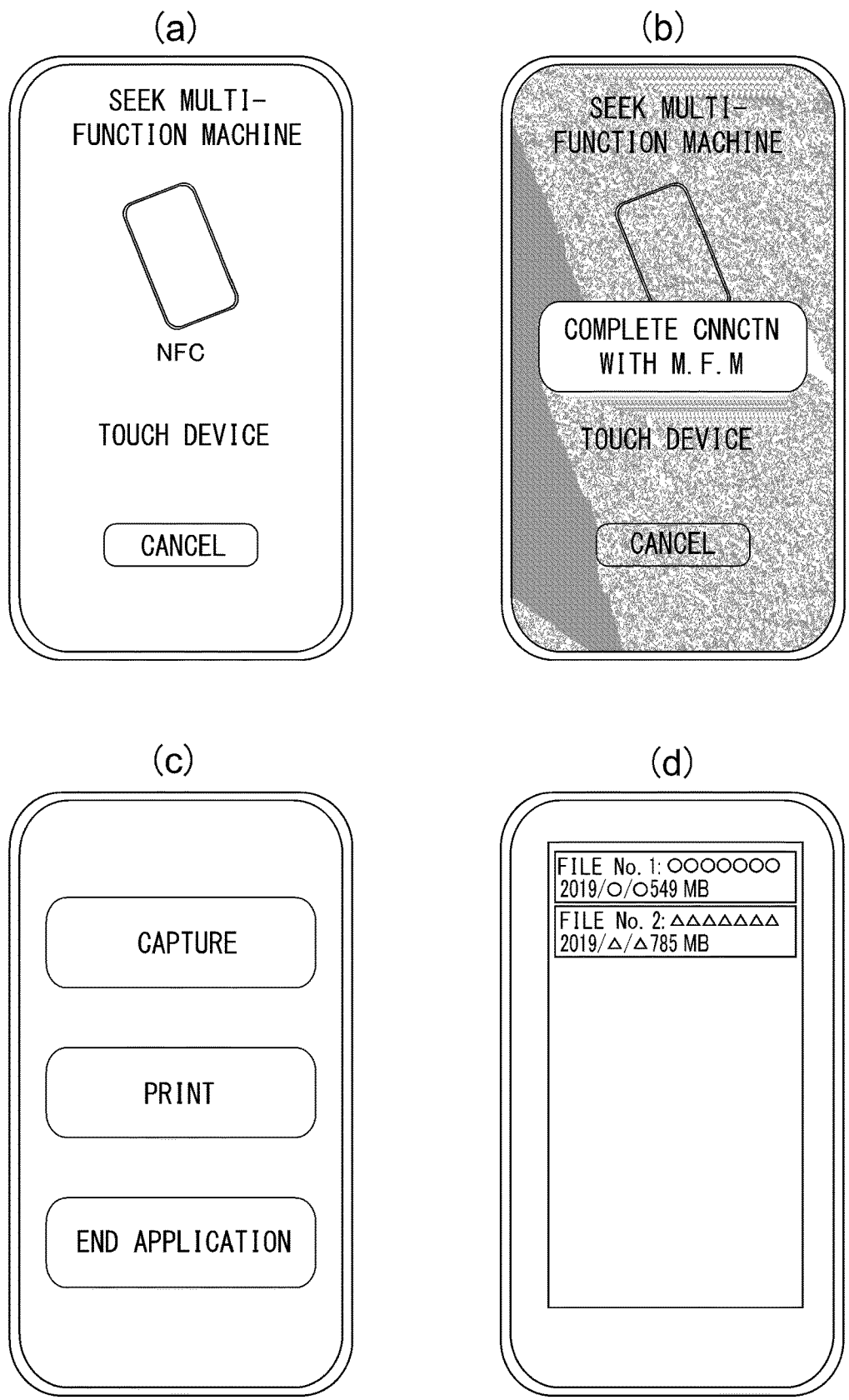

Parts (a) to (d) of FIG. 8 are schematic views for illustrating an application of the portable terminal.

Figure 9:
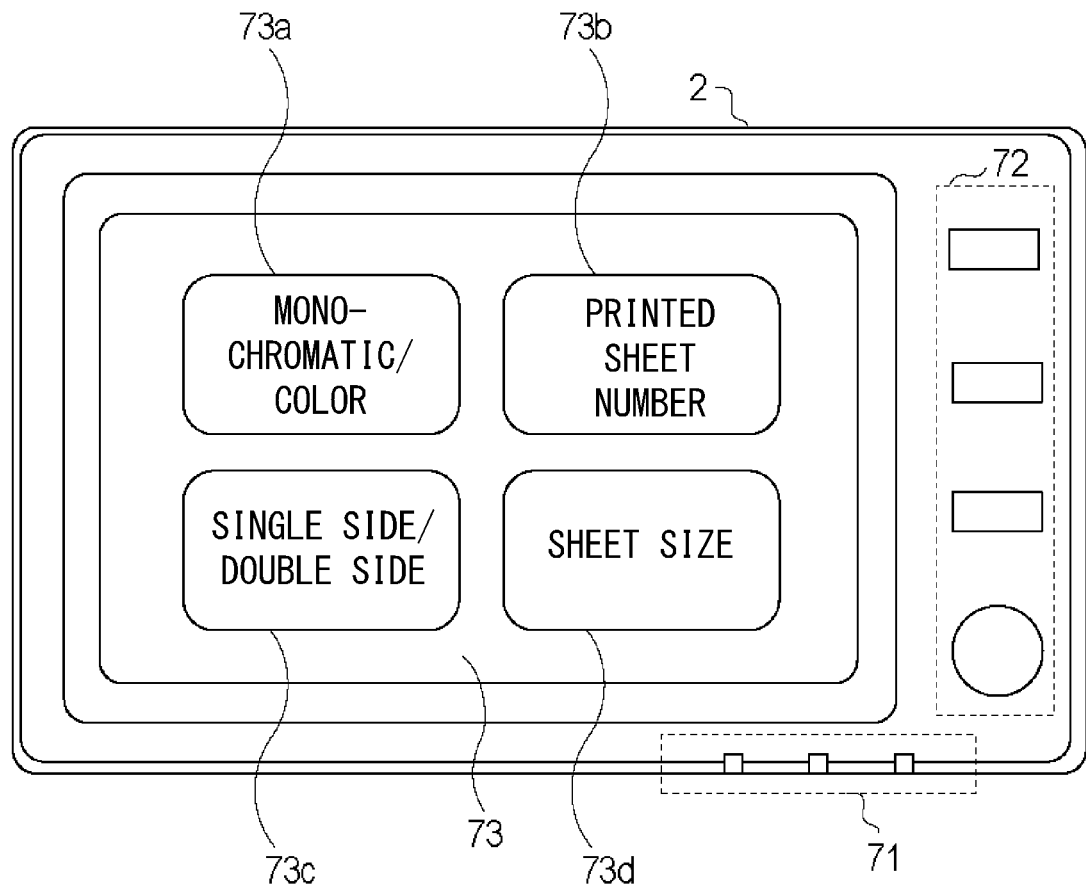

FIG. 9 is a schematic view illustrating a screen for setting a printing condition.

FIG. 10 is a list of persons (users) for which login to the image forming apparatus is allowed (authorized user list).

Parts (a) and (b) of FIG. 11 are schematic views for illustrating a conventional initial registration screen.

Figure 12:
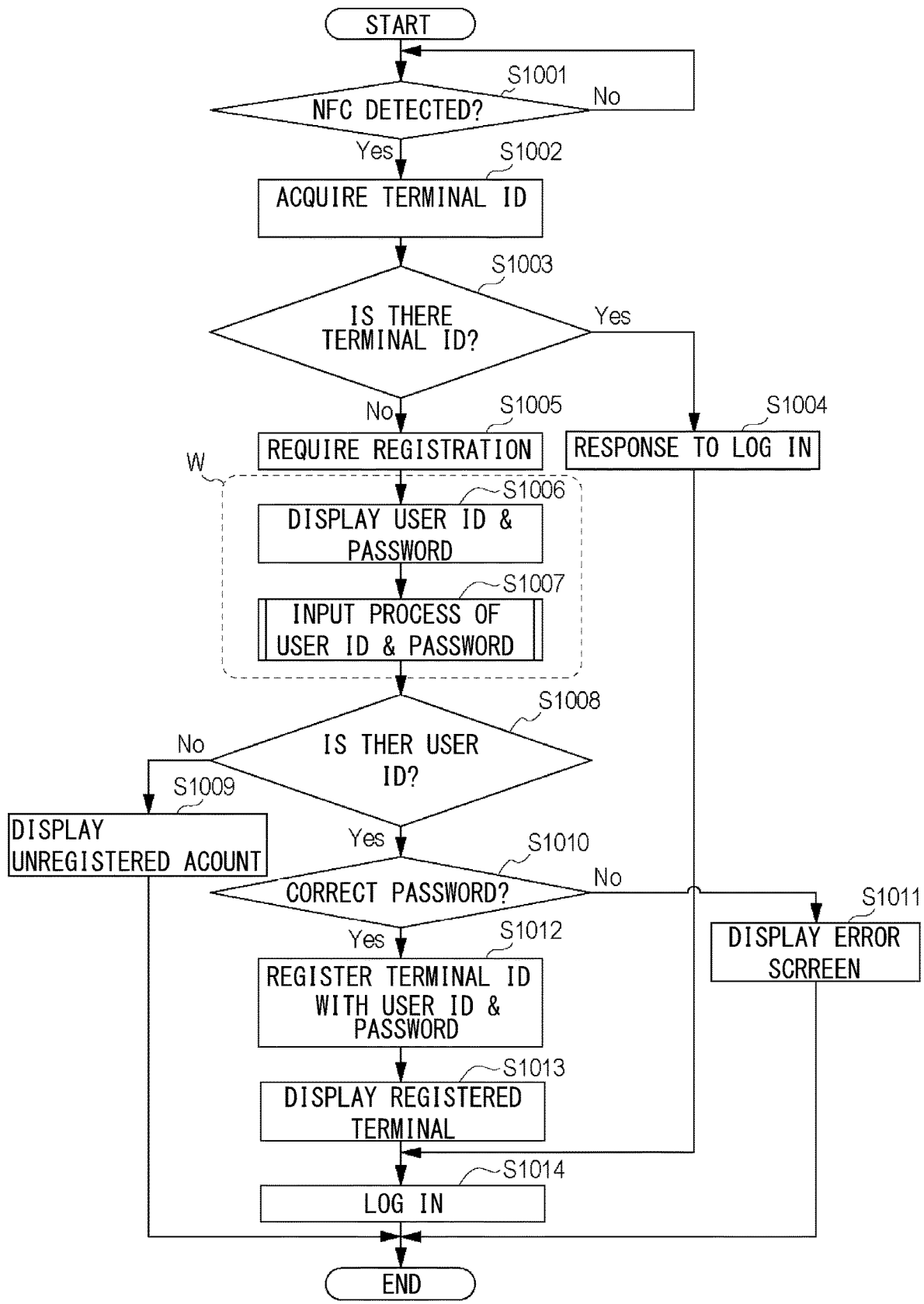

FIG. 12 is a flowchart for illustrating a flow of conventional initial registration.

Figure 13:
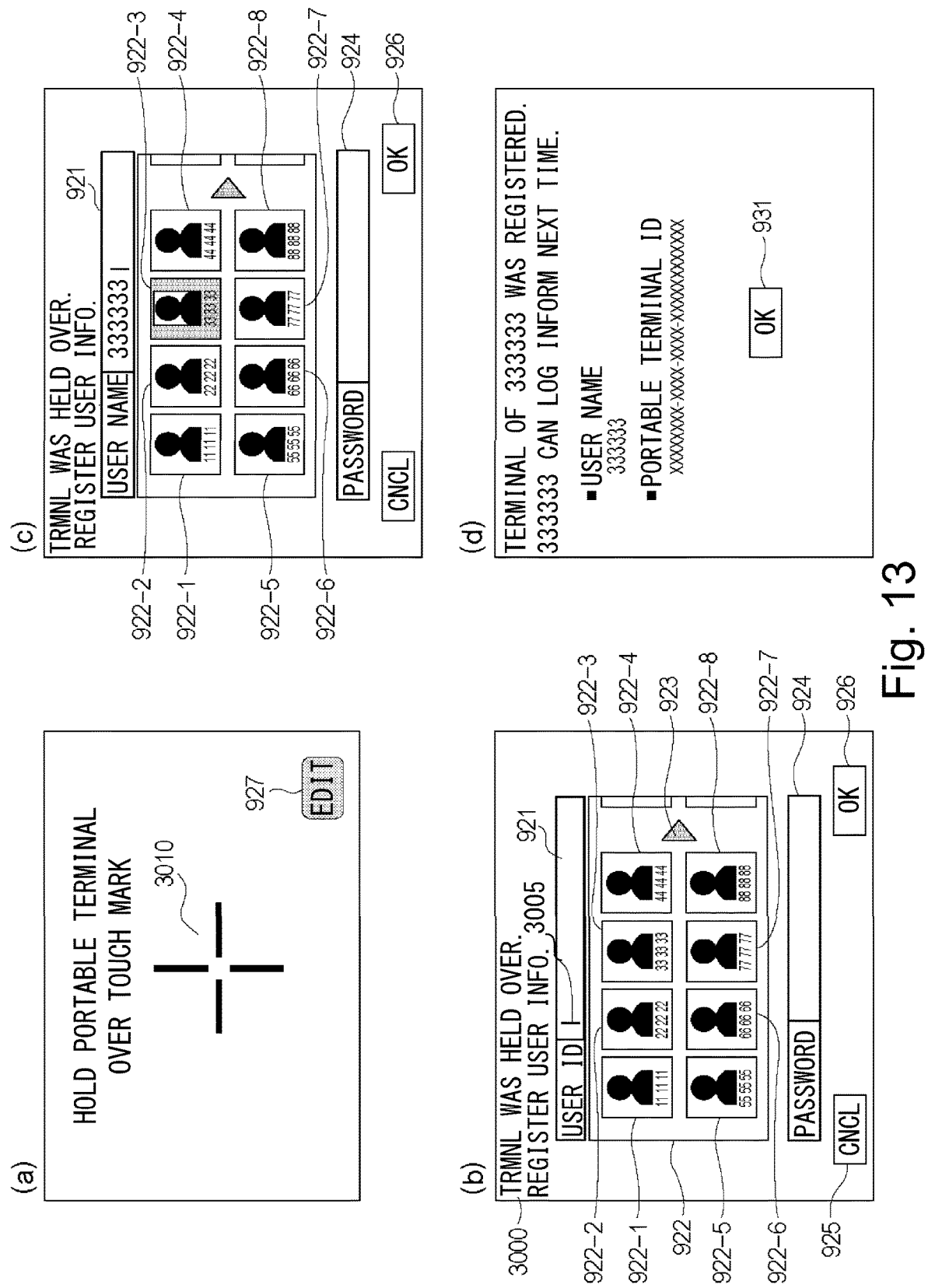

Parts (a) and (b) of FIG. 13 are schematic views for illustrating an initial registration screen in the present invention.

Figure 14:
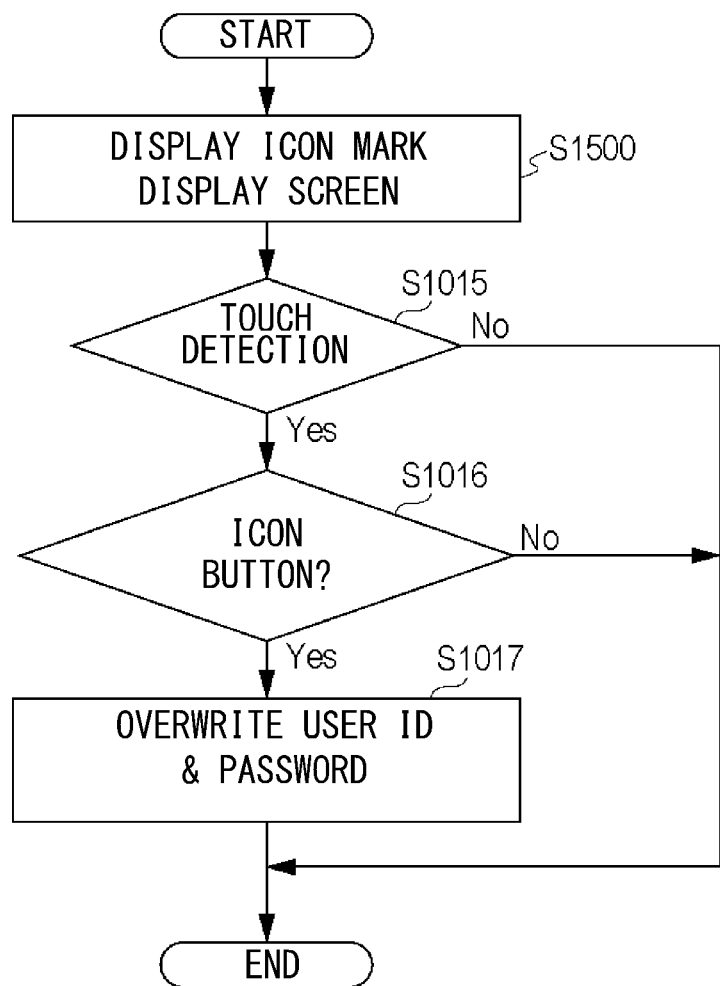

FIG. 14 is a flowchart for illustrating a flow of initial registration in the present invention.

Parts (a), (b), (c) and (d) of FIG. 15 are schematic views for illustrating a modified embodiment of the initial registration screen.

Parts (a) to (c) of FIG. 16 are schematic views for illustrating a modified embodiment of the initial registration.

Figure 17:
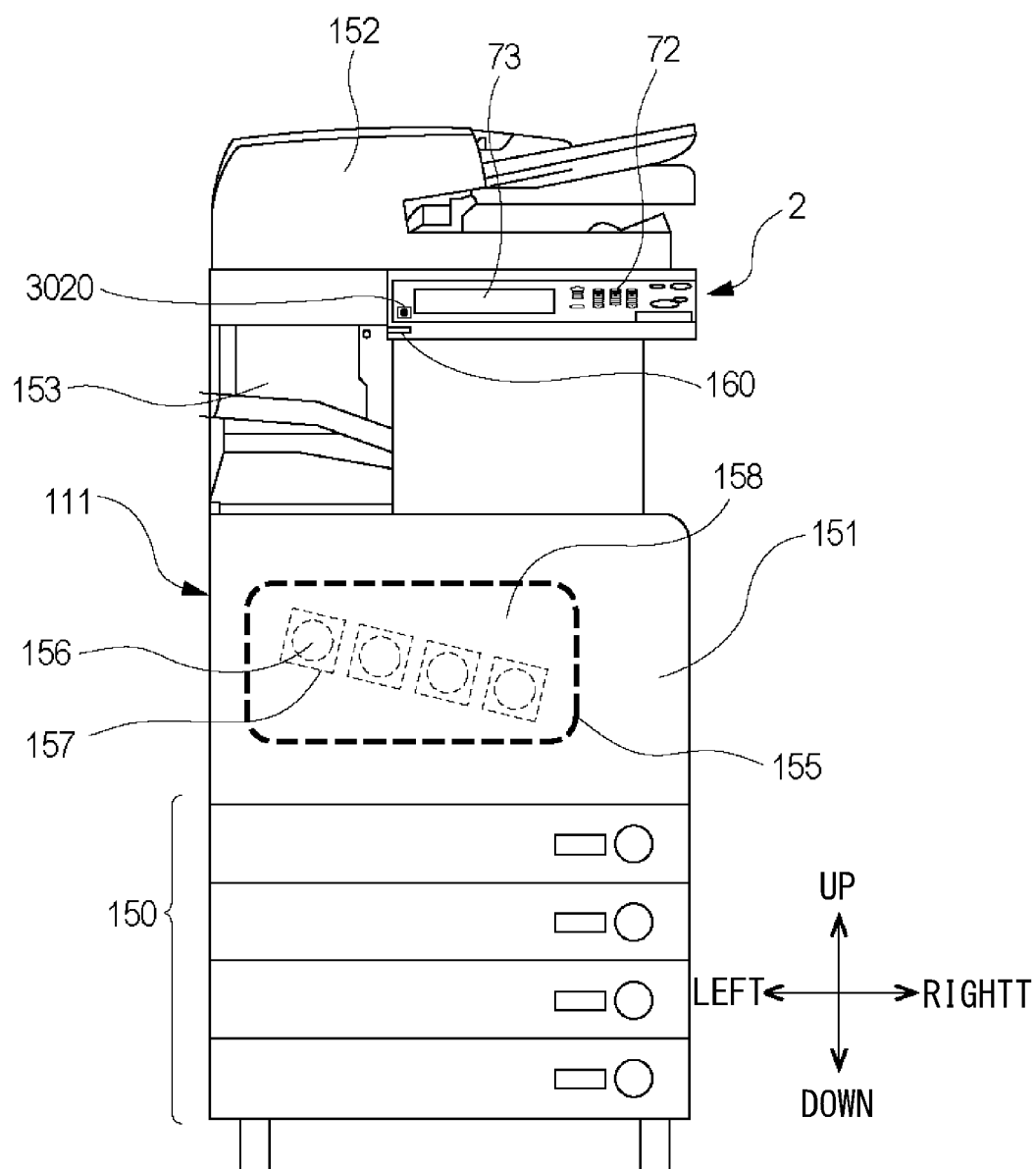

FIG. 17 is a schematic view of an image forming apparatus of an embodiment 2.

DESCRIPTION OF THE EMBODIMENTS

In the following, embodiments for carrying out the present invention will be described with reference to the drawings. In the following description, as regards dimensions, materials, shapes and relative arrangement of constituent elements, the scope of the present invention is not intended to be limited to those described below unless otherwise specified.

Embodiment 1

(Image Forming Apparatus)

Figure 1:
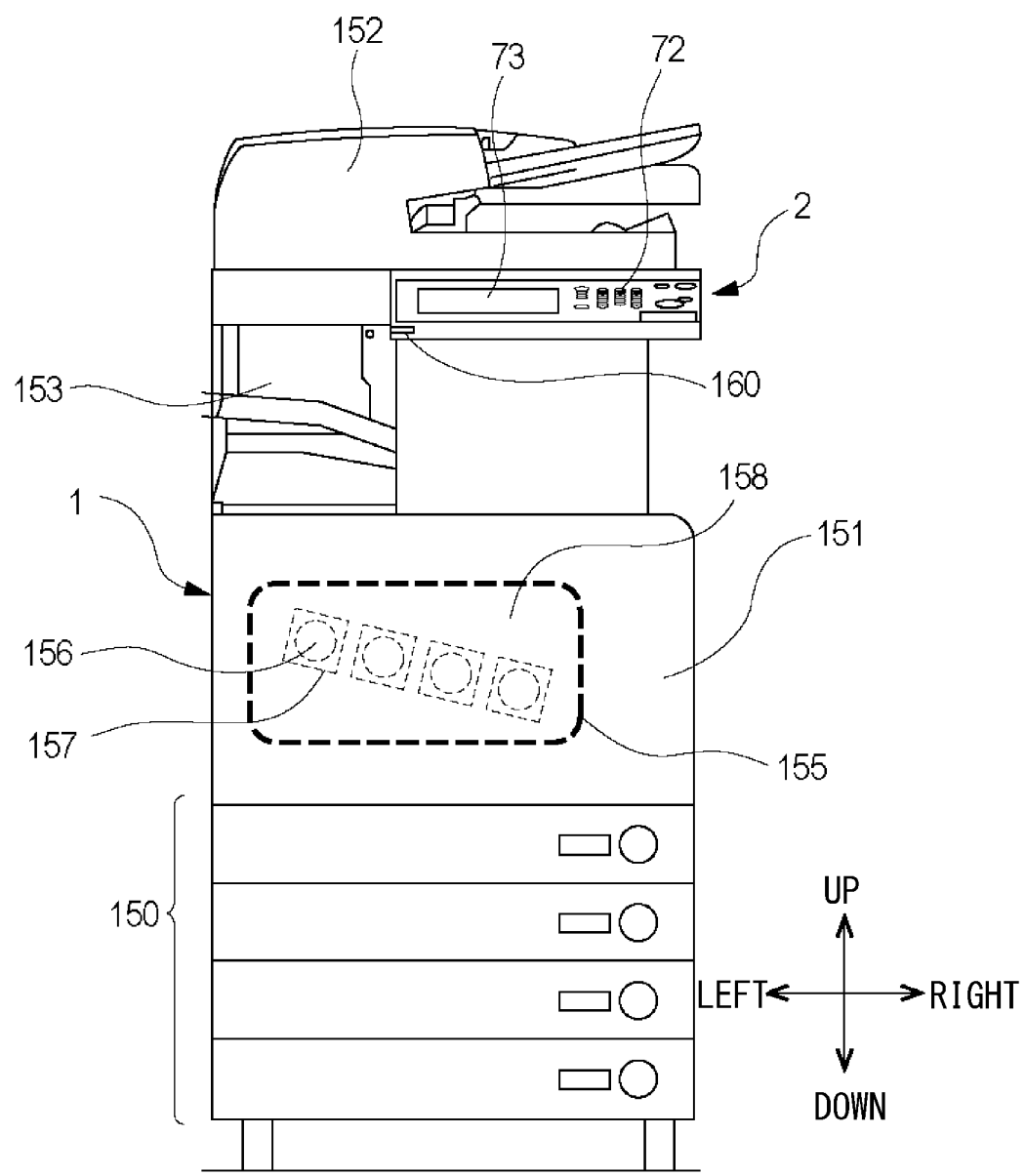
FIG. 1 is a schematic view of an image forming apparatus of an embodiment 1.

FIG. 1 is a schematic view showing a general structure of an image forming apparatus 1 in an embodiment 1. The image forming apparatus 1 is, for example, a multi-function machine having various functions such as a copying function, a reading function and a printing function. However, the image forming apparatus for carrying out the present invention is not limited to the copying machine, but for example, the image forming apparatus may also be a printer including no image reading apparatus 152.

In FIG. 1, the image forming apparatus 1 includes an image forming until for forming an image on a sheet such as a recording sheet which is an object to be recorded, and includes an image reading apparatus 152, provided above the image forming unit with respect to the vertical direction, for reading an image on a sheet such as an original to be read. The image forming apparatus 1 further includes the operating portion 2 through which an operator such as an operating person or a service person inputs information. The operating portion 2 includes a display panel 73 (described later) which is an example of a display portion and a hardware key portion 72 (described later).

Here, in this embodiment, the operating portion 2 includes a display panel 73 and the hardware key portion 72, but a constitution, which is so-called key-less constitution in which the hardware key portion 72 is not provided may also be employed. In the case of such a constitution, the operating portion 2 includes only the display panel 73. The display panel 73 is a touch panel, and receives input of information by the operator though a touch operation such as a touch, a flick, or a swipe. Further, the display panel 73 is capable of displaying information on printing condition to the operator. For example, when the operator prints an image on the sheet, information on a size thereof, the number of (printed) sheets and the like is displayed on the display panel 73. Conditions settable by the user when printing is carried out are collectively referred to as the "printing condition". Each of users is capable of registering a printing condition intrinsic to the user himself/herself in the image forming apparatus. For example, as regards the user for which most of the condition in the case of printing is A4-size monochromatic printing, at the time when the user logs in the image forming apparatus 1, the printing condition of the "A3-size monochromatic printing" may desirably be set. In a storing portion (storing user) 13 of the image forming apparatus 1 in this embodiment, the printing condition for each of users is capable of being stored. Accordingly, at the time when the login of the user to the image forming apparatus 1 is completed, the "printing condition" of the user is automatically set.

Here, the "login" refers to action by the user for receiving authentication by the image forming apparatus 1. Specifically, the "login" refers to action such that the user inputs a "user ID" and a "password" to the image forming apparatus 1. Action such that the user inputs the user ID and the password to a user ID input field 921 and a password input field 924, respectively, of FIG. 13 described below may also be referred to as the login, and action such that the user touches an OK button 926 after inputting the user ID and the password may also be referred to as the login. A "state in which the login is completed" refers to as a state in which the user is identified. For example, in the case where the "printing condition" is set in the image forming apparatus 1 by the user, in response to identification of the user by the CPU (control user) 7, the "printing condition" of the user is retrieved from the storing portion 13 and is automatically set. Further, when the user is in a login state, the display panel 73 may also display the user ID of the logged-in user. In a constitution in which such display is enabled, depending on whether or not the user ID is displayed, it is possible to discriminate whether or not a current user is in the login state.

Although specifically described later, in response to authentication performed by the operator by holding a portable terminal 6 over the display panel 73, the display panel 73 displays the information on image formation. For example, it is assumed that the operator selects an image file, to be printed, in the portable terminal 6. In that state, when the operator holds the portable terminal 6 over the display panel 73, a screen for setting the number of printed sheets is displayed on the display panel 73. This screen corresponds to a screen on which the information on image formation is to be displayed. When the operator inputs the number of printed sheets and presses down a start button, the image selected in the portable terminal 6 is printed in the selected (inputted) number of printed sheets.

Thus, the image forming apparatus 1 of this embodiment is operable in a mode in which use of the image forming apparatus 1 is allowed to the user by authenticating the user. The use of the image forming apparatus 1 referred to herein includes formation of the image on the sheet, use of a reading apparatus and the like.

The portable terminal 6 includes a mobile phone, a smartphone, a table terminal, and in addition, a wearable terminal such as a smartwatch. Further, the portable terminal 6 referred to herein also includes a card, such has an ID card (identification card), to which an individual identification number is assigned. So-called student identification card and employee identification card correspond thereto, and the cards are cards in which an IC (integrated circuit) chip for identifying an individual is buried.

In the image forming operation of the image forming apparatus 1, first, an image is inputted to the image forming apparatus 1 by the image reading apparatus 152 or an unshown image input means such as a personal computer connected to the image forming apparatus 1. Then, sheets to be recorded are fed one by one from an accommodating portion 150 provided at a lower portion of the image forming apparatus 1, and the inputted image is transferred onto the sheet by an image forming portion 158 and then is discharged to an in-body sheet (paper) discharge space 153. The image forming portion 158 is a generic term of portions, such as a photosensitive drum 156, a developing device, a charger and an intermediary transfer belt, for forming the image.

Various output conditions such as the number of outputted sheets and an image size are inputted from the operating portion 2, and on the basis of such information, control of the image forming apparatus 1 is carried out. In view of ease of the operation for the operator, the operating portion 2 is provided in front of the image reading apparatus 152 or at an upper portion of the image forming apparatus 1 on a front (surface) side of the image forming apparatus 1 in many instances. Incidentally, a side where the operator stands as seen from the image forming apparatus 1 when the operator faces the image forming apparatus 1 for operating the image forming apparatus 1 is defined as the front side. With respect to the vertical direction, the operating portion 2 is provided above the accommodating portion 150. Between the accommodating portion 150 and the in-body sheet discharge space 153, a front cover 151 constituting a front-side outer casing of the image forming apparatus 1 is provided. In the case where exchange of a drum cartridge (drum unit) 157 including the photosensitive drum 156 or exchange of a toner cartridge is carried out, the operator performs an exchange operation by opening this front cover 151. The drum cartridge 157 or the toner cartridge is exchanged by being extracted from and inserted into the image forming apparatus 1 from the front side of the image forming apparatus 1. That is, the front cover 151 is rotatable between a closed position where the front cover 151 closes an opening 155 for permitting passing of these cartridges and an open position where the front cover 151 opens the opening 155. These cartridges are exchanged when the front cover 151 is in the open position. When the front cover 151 is in the open position, the drum cartridge 157 and the toner cartridge is capable of being extracted from and inserted into the image forming apparatus 1 through the opening 155. A part of the image forming portion 158 is exposed when the front cover 151 is moved to the open position. The operating portion 2 is provided above the front cover 151 with respect to the vertical direction.

Here, a side where the operating portion 2 is provided is the front (surface) side of the image forming apparatus 1, and a side opposite from the front (surface) side is referred to as a rear (surface) side of the image forming apparatus 1. Further, as seen from the front side of the image forming apparatus 1, with respect to a widthwise direction perpendicular to a front-rear direction of the image forming apparatus 1, one side is referred to as a right(-hand) side, and the other side is referred to as a left(-hand) side.

Further, as shown in FIG. 1, the image forming apparatus 1 in this embodiment includes a human sensor 160. The human sensor 160 is a sensor for detecting an object existing at a periphery of the image forming apparatus 1. The human sensor 160 is used for detecting a human (the operator such as the user or the service person) approaching the image forming apparatus 1. A signal outputted from the human sensor 160 is inputted to a CPU 7 (an example of a control means) of a controller 3 (FIG. 3) and is processed by the CPU 7. The human sensor 160 includes an arcuate detection area at a front portion of the image forming apparatus 1. The human sensor 160 detects the human existing in this detection area.

The human sensor 160 is an ultrasonic sensor which outputs a pulse wave of 40 kHz in a non-audible range and which receive reflected wave of the pulse wave reflected by the object (human). Incidentally, the human sensor 160 may also be a sensor other than the ultrasonic sensor if the sensor is capable of detecting the object (including the human). For example, the human sensor 160 may also be an infrared transmitting/receiving module capable of confirming a change in distance between the sensor and the object every certain time similarly as in the case of the ultrasonic sensor or an infrared light-receiving sensor for receiving infrared radiation radiated from the human. Or, an electrostatic capacity sensor for measuring a distance between the sensor and the object on the basis of electrostatic capacity between the sensor and the object may also be used. Further, an infrared array sensor in which an infrared receiving portion is arranged in a line or a matrix, or a camera may also be used. Incidentally, these sensors may also be disposed so as to face upward in order to detect the human without being influenced by an obstacle such as a personal computer placed on a desk.

Figure 2:
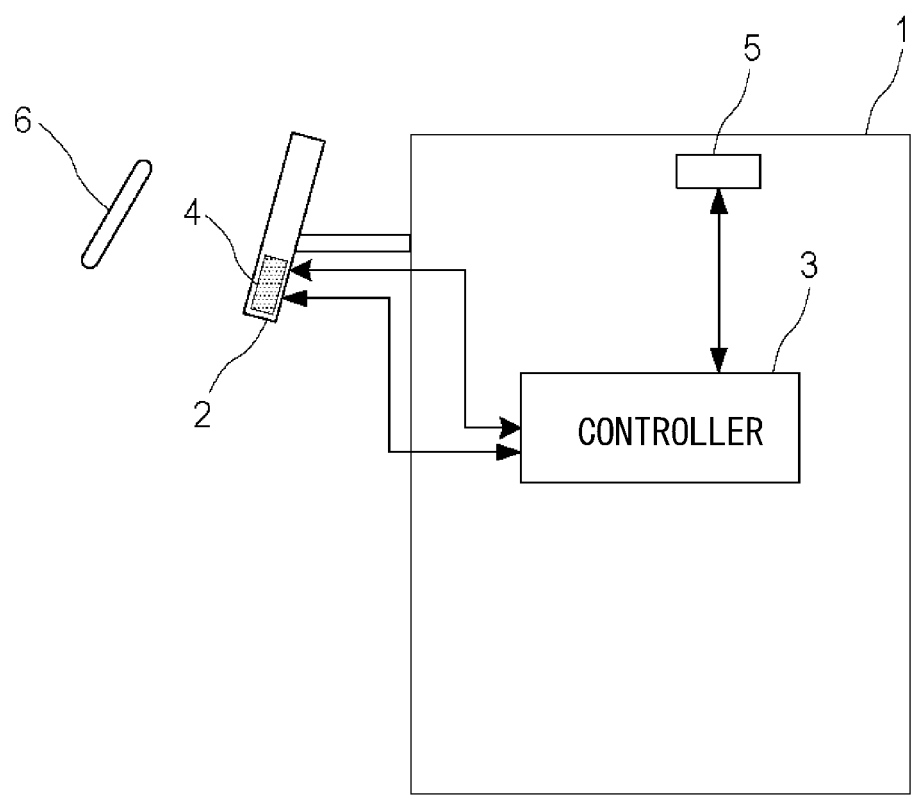
FIG. 2 is a schematic view of the image forming apparatus as seen from a right(-hand) side.

FIG. 2 is a schematic view of the image forming apparatus 1 as seen from a right side of the image forming apparatus 1. The operating portion 2 is provided on the front side of the image forming apparatus 2. Further, the operating portion 2 is provided so as to be inclined relative to a main assembly of the image forming apparatus 1. For that reason, the operator such as the user or the service person is capable of operating the operating portion 2 easily.

The image forming apparatus 1 is capable of performing near field wireless communication with the portable terminal 6. The near field wireless communication is called NFC (near field communication) and conforms to particularly a short-range (distance) wireless (radio) communication standard which is represented by ISO/IEC 18092, ISO/IEC 21481 or the like and in which a communication distance is 10 cm or less, and includes Felica (registered trademark) and Mifare (registered trademark) as representatives thereof. Further, herein, Bluetooth (registered trademark) is also a kind of the near field wireless communication. In this embodiment, as an example of the near field wireless communication, the form for performing the NFC will be described.

Further, the image forming apparatus 1 and the portable terminal 6 in this embodiment are also capable of performing normal wireless communication therebetween. The wireless communication referred to herein is wireless communication represented by Wi-Fi communication. Compared with the near field wireless communication such as the NFC, the wireless communication such as the Wi-Fi communication is wide in range of a communicatable area. Further, also regarding capacity of data capable of transmitting and receiving once, compared with the near field wireless communication such as the NFC, the wireless communication such as the Wi-Fi communication is large, i.e., a communication speed is fast. In this embodiment, as an example of the normal wireless communication broader in communicatable range and higher in communication speed than the near field wireless communication, the form for performing the Wi-Fi communication will be described.

In order to establish the NFC between the portable terminal 6 and the image forming apparatus 1, the operating portion 2 of the image forming apparatus 1 is provided with an NFC tag portion (acquiring user) 4, and a wireless LAN communicating portion 5 is provided inside the main assembly of the image forming apparatus 1. The NFC tag portion 4 and the wireless LAN communicating portion 5 are connected through an interface to the controller 3 for controlling an operation of the image forming apparatus 1, so that communication between the portable terminal 6 and the image forming apparatus 1 can be realized.

(Hardware Constitution)

Figure 3:
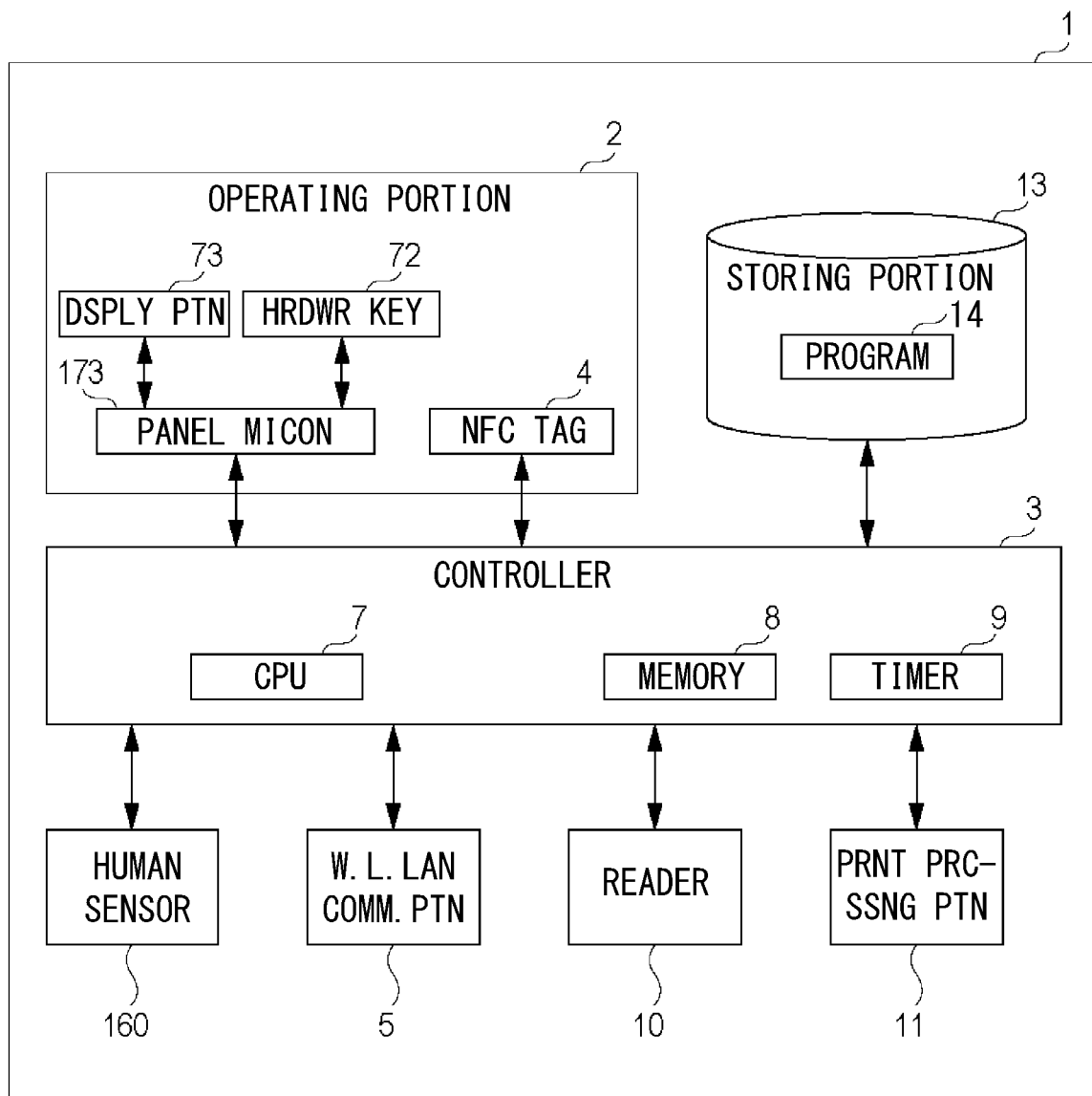
FIG. 3 is a block diagram for illustrating a hardware constitution of the image forming apparatus.

FIG. 3 is a block diagram showing a hardware constitution of the image forming apparatus 1 in this embodiment. As shown in FIG. 3, the image forming apparatus 1 includes the operating portion 2, the controller 3, the wireless LAN communicating portion 5, a reading portion 10, a print processing portion 11 and a storing portion 13. The storing portion 13 stores and manages the user information such as the user ID and the password. The user ID and the password are pieces of information assigned to each of users in order to identify an arbitrary user from a plurality of users. For example, in an office or the like, in order to identify each of employees, the user ID and the password are assigned to each of the users. Each of the employees uses the user ID and the password which are assigned to the employee himself/herself, so that the employee can log into the image forming apparatus 1. Thus, it is possible to prevent that a person who does not possesses the user ID and the password logs in to the image forming apparatus 1. Further, by designating persons who is capable of logging in to the image forming apparatus for each of organizations, it is possible to establish an environment in which unless the person possesses the user ID and the password, the person cannot log in to the image forming apparatus.

The operating portion 2 is provided with a constitution for displaying information to the operator and with a constitution for receiving an operation from the operator. The operating portion 2 includes a display panel 73, constituted by, for example, a liquid crystal panel, for displaying various pieces of information. Further, the operating portion 2 includes a hardware key portion 74 provided adjacent to the display panel 73. Further, the operating portion 2 includes an operating panel microcomputer 173 for controlling the display panel 73 and the hardware key portion 72 and for communicating with the controller 3.

The display panel 73 is capable of displaying an image on the liquid crystal panel by receiving image data from the controller 3 through a transfer line (not shown) for the image data. The NFC tag portion 4 performs the NFC on the basis of the NFC standard with an external device. By the NFC, input and output of the data are performed between the external device and the controller 3. The NFC tag portion 4 is constituted by an IC for RFID (radio frequency identification) and operates as an NFC tag.

The controller 3 includes a CPV 7, a memory 8 and a timer 9, and controls operations of respective portions. Further, the storing portion 13 is a storing device for storing various pieces of information. In the storing portion 13, a program 14 for causing the controller 3 to execute various processes is stored. The CPU 7 reads and executes the program 14 stored in the storing portion 13. Further, the storing portion 13 stores pieces of user information on various users and pieces of identification information of portable terminals 6. Although described later in detail, the storing portion 13 manages a list (authorized user list 800 described later) in which the pieces of user information and the pieces of identification information of the portable terminals 6 which are registered in advance by an administrator are linked (associated) with each other. The users managed in this list can log in to the image forming apparatus 1.

Incidentally, the pieces of "identification information" of the portable terminals 6 referred to herein are, for example, the numbers and character strings which are assigned to the respective terminals in order to individually identify the portable terminals 6. For example, in the case of smartphones, the numbers such as IMEI (International Mobile Equipment Identity) an MED (Mobile Equipment Identifier). Both of these are numerals assigned to the portable terminals such as mobile phones, and can uniquely identify the terminals. In addition, IMSI (International Mobile Subscriber Identity) which is identification number issued to a mobile phone subscriber may also be used. The IMSI is the number registered in a SIM card in general. Further, ICCID (ICC card Identifier) which is the number assigned to each of IC card may also be used as the identification information. This number is also assigned to the SIM card in the smartphone. As the identification information of the portable terminal 6, the identification information is not limited to the examples cited herein, but a sequence (of numbers) and a character string which are capable of uniquely identifying the portable terminal 6 may also be employed. Further, as a kind of the portable terminal 6, also as regards the case where the ID card such as the student identification card or the employee identification card is used, kinds thereof do not matter when the information thereof is information which is the number or the like assigned to each of the ID cards and which is capable of uniquely identifying the ID card. The memory 8 stores temporary data with the execution of the various processes by the CPU 7. The memory 8 is a storing device such as a RAM, for example. The timer 9 is used for performing timing when the controller 3 executes the various processes. The timer 9 starts timing when, for example, the NFC tag portion 4 first receives a polling signal described later, and the display panel 73 displays a message to the effect that NFC is failed when authentication is not performed even after a lapse of a predetermined time.

The wireless LAN communicating portion 5 performs a wireless LAN communication process with the external device and performs data input and output carried out between the external device and the controller 3. The wireless LAN communicating portion 5 in this embodiment performs processing of the wireless LAN communication on the basis of the wireless LAN standard. Specifically, in accordance with the wireless LAN standard, the wireless LAN communicating portion 5 performs sending (transmitting) and receiving processes of data packet.

Incidentally, the wireless LAN communicating portion 5 corresponds to a wireless LAN direct mode, and the wireless LAN communicating portion 5 operates as a wireless LAN access point (software access point). By this, it is possible to perform the wireless LAN communication with the external device without through an external wireless LAN access point.

The reading portion 10 is a processing portion for reading an original image and for generating image data. For example, the reading portion 10 includes an original feeding portion for feeding plurality of originals, stacked on an original stacking table of the image forming apparatus 152, one by one from a topmost original, and includes an image data output portion for converting the read original image into image data and for outputting the image data.

The print processing portion 11 is a processing portion for outputting a print by executing a printing process on the basis of the image data. For example, the print processing portion 11 includes the image forming portion 158 for forming an image on the basis of the image data, a transfer portion for transferring a toner image (image), formed by the image forming portion 158, onto a sheet, and a fixing portion for fixing the transferred toner image on the sheet. Further, the print processing portion 11 also includes a print conveying portion for discharging the print on which the toner image is printed, and the like portion.

Figure 4:
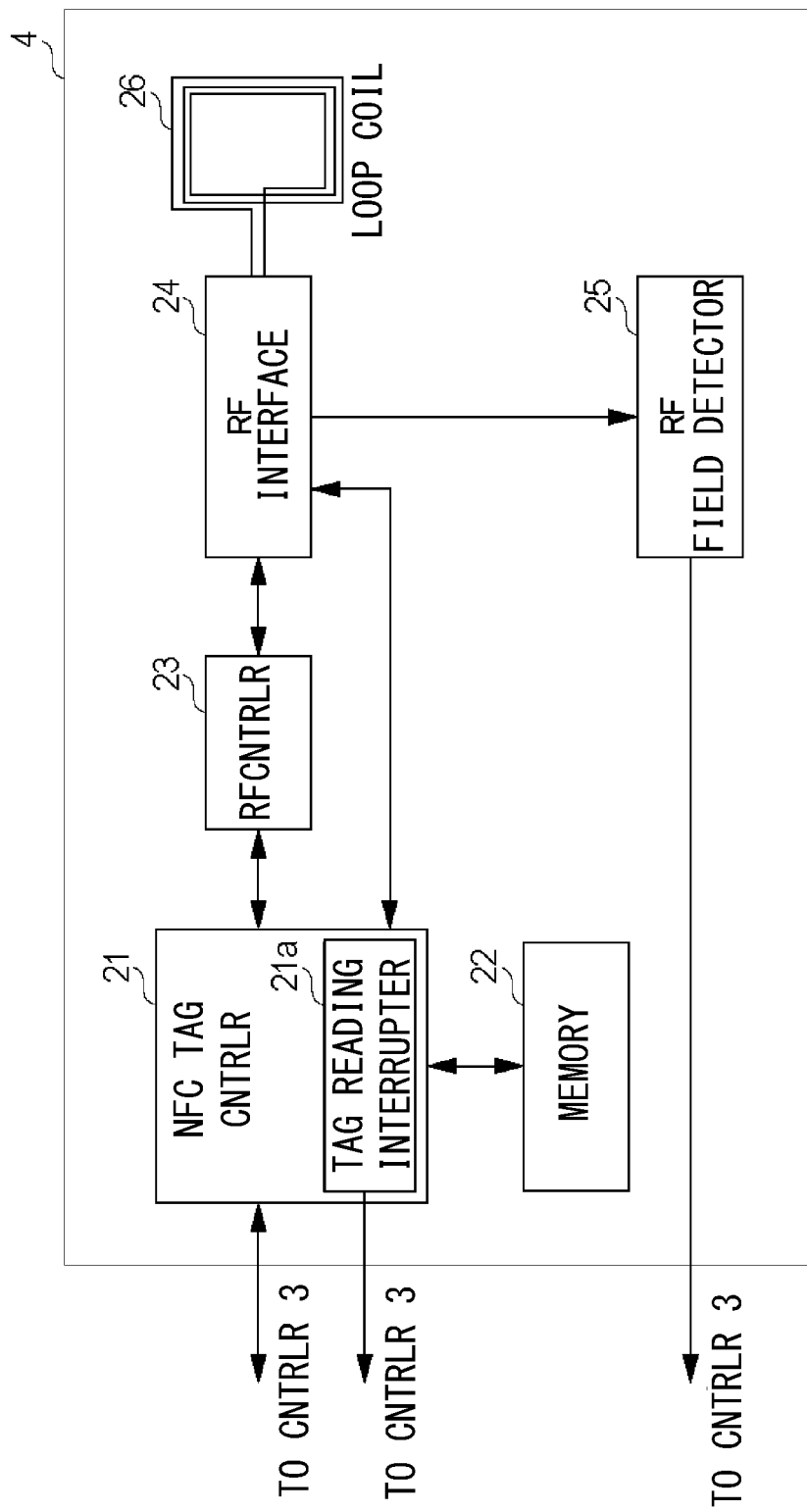
FIG. 4 is a block diagram for illustrating a hardware constitution of an NFC tag portion.

FIG. 4 is a block diagram showing a hardware constitution of the NFC tag portion 4. An NFC tag controller 21 carries out control of an RF controller 23 of the NFC tag portion 14 and performs data input and output relative to the controller 3. When the RF controller 23 performs communication with the external device, the RF controller 23 carried out a modulation/demodulation process of electromagnetic radiation for RF communication.

A tag reading interruption generating portion 21a of the NFC tag controller 21 generates an interruption signal when reading writing of the NFC tag data from the portable terminal through the NFC is performed. An interruption signal of the tag reading interruption generating portion 21a is outputted to the controller 3.

The memory 22 stores data written as the NFC tag data from the controller 3 or the portable terminal 6 and is constituted by a non-volatile memory. Further, the data written in the memory 22 is capable of being read by the controller 3.

An RF interface portion 24 performs electromagnetic coupling by being subjected to electromagnetic radiation when the NFC with the portable terminal which is the external device is performed, and performs receiving and sending processes of the electromagnetic radiation (electromagnetic wave).

An RF field detecting portion 25 detects an electromagnetic field (RF field) in a period in which the RF interface portion 24 is subjected to the electromagnetic radiation in the NFC with the portable terminal. Specifically, the RF field detecting portion 25 detects electric power (energy) of the electromagnetic radiation. A detection output of the RF field detecting portion 25 is connected to the controller 3.

A loop coil 26 (an example of an antenna) is an antenna for establishing the NFC. The loop coil 26 receives information from the portable terminal 6 positioned within a predetermined distance from the loop coil 26. Here, in this embodiment in which the NFC is employed as the near field wireless communication, the predetermined distance is 10 cm. However, depending on a kind of the near field wireless communication employed, this predetermined distance is different. In this embodiment, by the NFC, the loop coil 26 is formed in a loop shape for performing electromagnetic coupling by being subjected to the electromagnetic radiation from the external device and then for establishing the communication by the electromagnetic radiation. Although not shown in the drawings, the loop coil 26 is provided inside the operating portion 2. The NFC tag portion 4 performs the electromagnetic coupling by being subjected to the electromagnetic radiation from the external device and operates by receiving electric power supplied due to electromotive force generated by this electromagnetic coupling.

Figure 5:
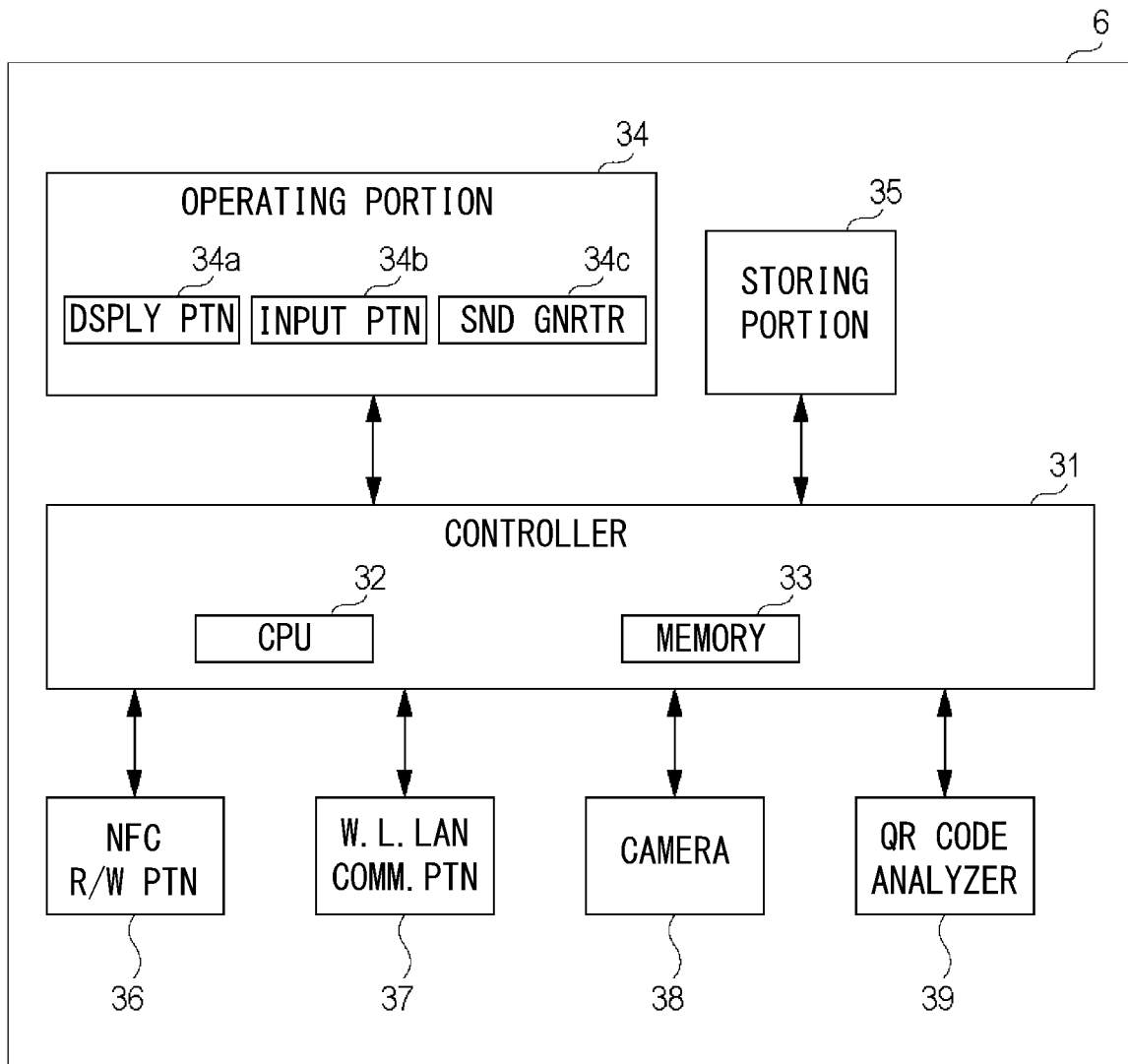
FIG. 5 is a block diagram for illustrating a hardware constitution of a portable terminal.

FIG. 5 is a block diagram showing an example of a hardware constitution of the portable terminal 6. A controller 31 controls the portable terminal 6 and is constituted by a CPU 32 and a memory 33. The CPU 32 reads and executes various programs stored in a storing device (portion) 35. The memory 33 stores temporary data and the like with execution of the programs by the CPU 32.

An operating portion 34 is provided with a constitution for displaying information to the operator and with a constitution for receiving an operation from the operator. The operating portion 34 is constituted by, for example, a liquid crystal panel and includes a display portion 34a for displaying various pieces of information. Further, the operating portion 34 detects an operation to a touch panel or the like provided on the display portion 34a and includes an operation input portion 34b for inputting an operation instruction by the contact from a detection result thereof. Further, the operating portion 34 includes an operating panel microcomputer 34d for communicating with the controller 31 by controlling the display portion 34a or the operation input portion 34b. Further, the operating portion 34 includes an operation sound generating portion 34c for generating various operation sounds with operations.

An NFR_R/W portion 36 performs the NFC on the basis of the NFC standard, and thus performs data input and output carried out between the external device and the controller 3.

A wireless LAN communicating portion 37 performs communication processing with the external device on the basis of the wireless LAN standard, and thus performs data input and output carried out between the external device and the controller 31. In this embodiment, the wireless LAN communicating portion 37 performs processing of the wireless LAN communication on the basis of the wireless LAN standard. Specifically, in accordance with a wireless LAN communication procedure, the wireless LAN communicating portion 37 carries out sending and receiving processes of data packet.

A camera 38 is a camera for image pick-up. A QR code (registered trademark) analyzing portion 39 analyzes a read QR code and acquires a QR code data.

Figure 6:
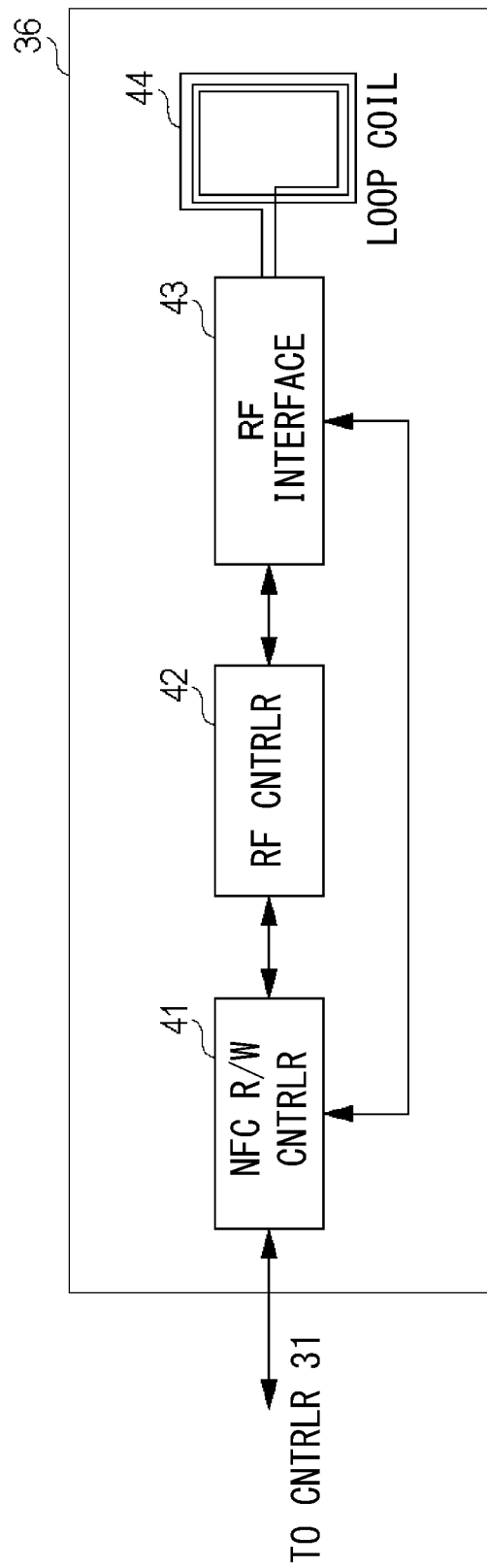
FIG. 6 is a block diagram for illustrating a hardware constitution of an NFC_R/W portion.

FIG. 6 is a block diagram specifically showing an example of a hardware constitution of the NFC_R/W portion 36. An NFR_R/W controller 41 carries out data input and output relative to the controller 31 through an interface.

An RF controller 42 performs modulation and demodulation of the electromagnetic radiation for RF communication when the NFC with the external device is carried out.

An RF interface portion 43 performed electromagnetic coupling by electromagnetic radiation (or by being subjected to electromagnetic radiation) when the NFC with the external device is carried out, and thus performs receiving and sending processes of the electromagnetic radiation.

A loop coil 44 is a coil for establishing the NFC with the external device. (NFC and Wi-Fi communication between image forming apparatus and portable terminal)

FIG. 7 is a schematic view for illustrating a mechanism in which the image forming apparatus 1 in this embodiment establishes the wireless communication (Wi-Fi communication), such as the NFC and the Wi-Fi, with the portable terminal 6. The NFC_R/W portion 36 of the portable terminal 6 performs electromagnetic coupling with the NFC tag portion 4 of the image forming apparatus 1 and reads the NFC tag data of the NFC tag portion 4 by the NFC. The NFC tag data includes an SSID, an encryption key and an IP address which are necessary to perform the Wi-Fi communication. That is, the operator is capable of acquiring the SSID, the encryption key and the IP address for establishing the Wi-Fi communication with the image forming apparatus 1 by performing an operator of holding the portable terminal 6 over the image forming apparatus 1, and thus is capable of starting the Wi-Fi communication between the portable terminal 6 and the image forming apparatus 1.

The image forming apparatus 1 performs authentication of the portable terminal 6 toner the NFC and performs data transfer through the Wi-Fi communication.

First, an operation, indicated by S1000 in FIG. 7, performed from the portable terminal 6 to the image forming apparatus 1 will be described. The NFC_R/W portion 36 performs a polling operation for reading the NFC tag data of the NFC tag portion 4. The polling is one of control types in which a plurality of devices and a plurality of pieces of software are smoothly associated with each other. By performing the polling operation, it is possible to prevent an occurrence of an inconvenience due to contention of a certain system (the portable terminal 6 in this embodiment), with another system, which is intended to establish communication with a main system (the image forming apparatus 1 in this embodiment). Here, first of all, a constitution in which a polling signal is sent from the portable terminal 6 side to the image forming apparatus 1 will be described. However, the form of a polling communication is not limited to the constitution in which the polling is carried out from the portable terminal 6 to the image forming apparatus 1, but a constitution in which the polling is carried out from the image forming apparatus 1 to the portable terminal 6 may also be employed. The constitution in which the polling is carried out from the image forming apparatus 1 to the portable terminal 6 will be described later using part (b-1) to (b-3) of FIG. 7.

In response to the polling performed from the portable terminal 6, the image forming apparatus 1 actuates the NFC tag portion 4. The NFC_R/W controller 41 of the NFC_R/W portion 36 of the portable terminal 6 controls the RF controller 42, and thus modifies the electromagnetic radiation on the basis of the NFC standard. This modified wave (radiation) is transmitted to the RF interface portion 43. Further, the transmitted modified wave is radiated as the electromagnetic radiation from the RF interface portion 43 through the loop coil 44. By this (radiated) electromagnetic radiation, an RF field is formed in the neighborhood of the NFC_R/W portion 36 and the NFC tag portion 4, so that the NFC_R/W portion 36 and the NFC tag portion 4 are electromagnetically coupled to each other. That is, the NFC is started.

Next, an operation, indicated by S1001 in FIG. 7, performed from the image forming apparatus 1 to the portable terminal 6 after the NFC is started will be described.

The loop coil 26 receives the electromagnetic radiation radiated from the loop coil 44 in S1000. The received electromagnetic radiation is transmitted to the RF interface portion 24, and the RF interface portion 24 generates the electromotive force due to the electromagnetic coupling. By this electromotive force, the NFC tag portion 4 is supplied with electric power and thus operates. Simultaneously, the electromagnetic radiation received by the RF interface portion 24 is transmitted to the RF controller 23.

The NFC tag controller 21 controls the RF controller 23, and acquires demodulation data by demodulating the electromagnetic radiation transmitted to and modulated by the RF controller 23. The NFC tag controller 21 acquires the demodulation data and detects that reading requirement of the NFC tag data is made from the portable terminal 6. By this, the NFC tag controller 21 reads the data (the SSID, the encryption key and the IP address) written as the NFC tag data in the memory 22, and then transfers the data as response data to the RF controller 23.

The NFC tag controller 21 modulates the response data by controlling the RF controller 23. The NFC tag controller 21 modulates the response data on the basis of the NFC standard by controlling the RF controller 23. The modulated data is radiated as the electromagnetic radiation through the RF interface portion 24 and the loop coil 26. In response to an end of sending of the response data, the NFC tag controller 21 generates an interrupting signal by the tag reading interruption generating portion 21*a*.

Then, the loop coil 44 of the portable terminal 6 receives the electromagnetic radiation with the response data radiated from the loop coil 26 of the image forming apparatus 1. The received electromagnetic radiation is transmitted to the RF controller 42 through the RF interface portion 43. The NFC_R/W controller 41 controls the RF controller 42 and thus demodulates the electromagnetic radiation transmitted to the RF controller 42, so that the NFC_R/W controller 41 acquires the demodulation data.

Thereafter, the NFC_R/W controller 41 notifies the controller 31 of completion of reading of the NFC tag data by the NFC tag portion 4. At the same time, the NFC_R/W controller 41 transfers the read NFC tag data to the controller 31.

When the controller 31 receives notification, from the NFC_R/W controller 41 of the NFC_R/W portion 36, to the effect that the reading of the NFC tag data is completed, the controller 31 causes the operation sound generating portion 34*c* of the operation panel 34 to generate an operation completion sound.

By this, the operator is capable of knowing completion of the reading of the NFC tag data of the NFC tag portion 4 in the image forming apparatus, by the NFC_R/W portion 36 of the portable terminal (device) 6.

Next, by using the NFC tag data (the SSID, the encryption key and the IP address) acquired by the portable terminal 6 through the NFC, a step S1002 in which a connection requirement of the Wi-Fi communication is outputted from the portable terminal 6 to the image forming apparatus 1 will be described.

In general, in the wireless communication such as the Wi-Fi, a network is formed by connecting a Wi-Fi ready terminal to the access point performing a function of a relay point. In an example of this embodiment, the access point corresponds to the image forming apparatus 1, and the Wi-Fi ready terminal corresponds to the portable terminal 6. Here, for example, in the case where a plurality of image forming apparatuses each performing the function of the access point exist, the portable terminal 6 has to select that the portable terminal 6 should be connected to which access point. The operator is required to discriminate that the portable terminal 6 should be connected to which access point, and a means function as a discrimination indicator at that time is the SSID. In the case where the operator performs wireless communication of the portable terminal 6 to the image forming apparatus 1 without using the NFC, there is a need to select the SSID corresponding to the image forming apparatus 1 from a plurality of SSIDs and then to connect the portable terminal 6 to the image forming apparatus 1. By automatically acquiring the SSID through the NFC, it is possible to save time and effort such that the operator manually selects the SSID corresponding to the image forming apparatus 1. The SSID is included in the NFC tag data.

In the case where the image forming apparatus can be discriminated (identified) by the SSID, establishment of the Wi-Fi communication is performed, but the encryption key is needed at that time. The encryption key is required to encrypt communication contents. When the operator selected the SSID manually, the operator also inputs the encryption key manually. The NFC tag data includes the SSID, and therefore, in response to a touch of the portable terminal 6 to the NFC tag portion 4 by the operator, in addition to the SSID, the encryption key is also sent to the portable terminal 6.

Further, the NFC tag data also includes information on the IP address of the image forming apparatus 1. For that reason, the portable terminal 6 acquired the NFC tag data is capable of knowing the address of the image forming apparatus on the network.

Thus, authentication of the portable terminal 6 by the image forming apparatus 1 is ended. The portable terminal 6 and the image forming apparatus 1 prepares for wireless communication connection (connection through Wi-Fi communication) for transferring data, by the authentication of the portable terminal 6 performed by the image forming apparatus 1.

First, the portable terminal 6 acquired the NFC tag data sends, to the image forming apparatus 1, "connection requirement" for establishing the Wi-Fi communication with the image forming apparatus 1 by using this data. Then, the image forming apparatus received the "connection requirement" sends, to the portable terminal 6, a message to the effect that the image forming apparatus 1 received the requirement, as "connection response", so that a state of the Wi-Fi communication is established.

When the CPU 7 receives the "connection requirement" from the portable terminal 6, i.e., with the CPU 7 detects that the authentication using the SSID and the encryption key is performed, the CPU 7 ends the NFC. Timing when the CPU 7 detected that the authentication by the portable terminal 6 was performed for starting the Wi-Fi communication is timing of an end of the NFC.

As described above, in response to the touch of the portable terminal 6 to the NFC tag portion 4 by the operator, the NFC is started. The operation when the operator touches the NFC tag portion 4, with the portable terminal 6, all the selection of the SSID and the input of the encryption key are automatically performed. For that reason, for the operator, the W-Fi communication is started in response to the touch of the portable terminal 6 to the NFC tag portion 4, and therefore the operator can actually feel good usability.

Here, the constitution in which the polling is carried out from the image forming apparatus 1 to the portable terminal 6 will be described. Parts (b-1) to (b-3) of FIG. 7 are schematic views for illustrating the polling communication. As has already been described, in this embodiment, the portable terminal 6, the ID card and the like are assumed. The portable terminal 6 is a portable terminal 6 of a so-called active type such that when the near field wireless communication is performed by the NFC_R/W portion 36, the electromagnetic radiation is radiated using electric power of a battery incorporated in the portable terminal 6. On the other hand, the ID card does not incorporate a battery, and therefore the ID card itself cannot radiates the electromagnetic radiation using the electric power. For that reason, the ID card is a portable terminal 6 of a passive type in which the electromagnetic radiation is radiated by using the received electromagnetic radiation as an energy source. Depending on whether or not the portable terminal 6 is of the active type or the passive type, the operation of the polling is somewhat different.

Although described above, the polling operation is the operation for detecting the portable terminal 6, the ID card and the like within a communicatable distance. As shown in part (b-1) of FIG. 7, an output operation for outputting a polling signal 180 for detecting the portable terminal 6 within the communicatable distance and a monitor operation for monitoring, for a predetermined time, reception of a response signal from the portable terminal 6 with respect to the polling signal are regarded as a set of operations, and this set of operations are repeated in a predetermined number of times. Accordingly, during the polling operation, the polling signal is outputted at a predetermined output interval 183. Incidentally, in the following, a period during the polling operation (a period in which detection of the portable terminal 6 is carried out by outputting the polling signal) is referred to as a "detection period 184".

The NFC tag portion 4 receives response data from the portable terminal 6 in the case where in the detection period 184, the portable terminal 6 falls within a communicable distance of the NFC tag portion 4. Here, between the case where the portable terminal 6 fallen within the communicatable distance of the NFC tag portion 4 is the portable terminal 6 of the passive type (for example, the ID card or the like) and the case where the portable terminal 6 is the portable terminal 6 of the active type (for example, the smartphone), basically, receiving timing of response data received by the NFC tag portion 6 (i.e., a period of an output of the polling signal until the NFC tag portion 6 receives the response data depending on the polling signal) is different.

For example, as regards the ID card which is an NFC module of the passive type, when the polling signal 180 is received, response data (response signal 181) is outputted as reflected wave of the polling signal. For this reason, as shown in part (b-2) of FIG. 7, when the ID card falls within the communicatable distance of the NFC tag portion 4, the period from the output of the polling signal 180 by the NFC tag portion 4 until the NFC tag portion 4 receives the response data 181 is shortened. On the other hand, the portable terminal 6 which is the portable terminal 6 of the active type is a device for sending response data by electric power of itself, and therefore, different from the portable terminal 6 of the passive type, there is no need to output the response data immediately after receiving the polling signal. For this reason, as shown in part (b-3) of FIG. 7, when the portable terminal 6 falls within the communicatable distance of the NFC tag portion 4, a period from the output of the polling signal 180 by the NFC tag portion 4 until the NFC tag portion 4 receives response data 182 becomes long. Incidentally, in the case where the NFC tag portion 4 receives the response data 182 from the portable terminal 6 during the polling operation, the NFC tag portion 4 interrupts the polling operation and takes over subsequent respective processes for the NFC to the CPU 7.

The NFC tag portion 4 sends the SSID and the encryption key to the portable terminal 6 in response to reception of the response data from the portable terminal 6. These data are small in capacity, and therefore, can be sent through the near field wireless communication. The portable terminal 6 is handover-connected to Wi-Fi communication by using the SSID and the encryption key which are received from the NFC tag portion 4. In response to the connection requirement of the Wi-Fi communication from the portable terminal 6, the near field wireless communication between the NFC_R/W portion 36 and the NFC tag portion 4 ends.

Parts (a) to (d) of FIG. 8 are schematic views each showing a screen of the portable terminal 6 in a state in which a dedicated application is launched. Part (a) of FIG. 8 shows the screen displayed on the portable terminal 6 when the dedicated application is launched. At this time, the portable terminal 6 radiates the electromagnetic radiation for carrying out polling. In this embodiment, an item of "CANCEL" is provided. When the operator touches this item, the portable terminal 6 stops the electromagnetic radiation for carrying out the polling, and the application ends. Further, also in the case where a predetermined time has elapsed from display of the screen of "SEEK MULTI-FUNCTION MACHINE" (in progress) shown in part (a) of FIG. 8, the application ends automatically.

Part (b) of FIG. 8 is the screen displayed temporarily in response to establishment of the Wi-Fi communication between the portable terminal 6 and the image forming apparatus 1. By display of this screen, the operator is capable of confirming the establishment of the Wi-Fi communication between the portable terminal 6 and the image forming apparatus 1.

After the screen of part (b) of FIG. 8 is temporarily displayed, the screen transfers to the screen of part (c) of FIG. 8. The screen of part (c) of FIG. 8 is a job selection screen for selecting a job to be executed. In this embodiment, in this job selection screen, three items "CAPTURE", "PRINT" and "END APPLICATION" are displayed. Incidentally, the number of the items displayed in this screen is not limited to the three items. A specification is such that a job other than jobs of the "CAPTURE" and the "PRINT" can be selected may be used, and a specification such that another job can be selected in addition to these jobs may also be used.

Here, functions of the two jobs of the "CAPTURE" and the "PRINT" capable of being executed by using the application in this embodiment will be briefly described.

The "CAPTURE" is a function of capturing data of an original read (scanned) by the image forming apparatus 1, as an image, into the portable terminal 6. When the original is read by the image forming apparatus 1, for example, the image reading apparatus 152 can be used. In the case where the screen of part (b) of FIG. 8 is displayed and the Wi-Fi communication between the portable terminal 6 and the image forming apparatus 1 is established, the operator sets the original, intended to be captured in the portable terminal 6, in the image reading apparatus 152. Thereafter, when the operator touches the item of the "CAPTURE" on the screen of part (c) of FIG. 8, the reading of the original into the image reading apparatus 152 is started.

When the reading of the original is ended, the image forming apparatus 1 sends, to the portable terminal 6, image data of the read original through the Wi-Fi communication. Thus, the capture of the original into the portable terminal 6 is completed.

Further, the "PRINT" is a function of printing an image and a document file which are stored in the portable terminal 6 or a WEB page during browsing, by the image forming apparatus 1. In the screen of part (c) of FIG. 8, when the operator touches the item of the "PRINT", the screen transfers to the screen of part (d) of FIG. 8. The screen of part (d) of FIG. 8 is an example showing a list screen of files capable of being printed by using the image forming apparatus 1. In this screen, the operator selects the file which is intended to be printed by the operator. When the file is selected, image data relating to the file is sent to the image forming apparatus 1. The image forming apparatus 1 forms an image on the basis of the image data sent from the portable terminal 6 and prints the image on a sheet. Thus, the operator is capable of printing the image and the document filed which are stored in the portable terminal 7 and the WEB page during browsing. Compared with the near field wireless communication such as the NFC, in the wireless communication such as the Wi-Fi communication, a capacity of data communicatable per unit time is large, and therefore, even data including an image such as a photography or a document file is capable of being transferred smoothly.

Here, the form of the application is not limited to the form in this embodiment. For example, at first, the screen shown in part (c) of FIG. 8 is displayed, and the operation to be executed may also be selected. In this case, for example, when the operator selects the "PRINT", the operator selects the image file to be printed (part (d) of FIG. 8) and then holds the portable terminal over the display panel 73. Then, authentication is performed in response to the holding of the portable terminal 6 over the display panel 73, and thereafter the Wi-Fi communication is started, so that a desired image is printed. The operator first selects an image desired to be printed and then holds the portable terminal 6 over the display panel 73, so that the associated image is printed from the image forming apparatus 1, and therefore, the operator is capable of printing the image by a simple operation.

FIG. 9 is an example of a screen displayed on the display panel 73 when the authentication by the NFC is performed and the Wi-Fi communication is enabled. A condition such as the number of printed sheet, a sheet size or the like may be selected by the application provided on the portable terminal 6 side described with reference to FIG. 8, but as shown in an example of FIG. 9, such a condition may also be selected by using the display panel 73 as in an example shown in FIG. 9. This screen is also an example of a "screen displaying information relating to image formation". This screen is displayed in response to the authentication of the portable terminal 6 performed through the NFC.

Specifically, first, the operator selects the image file, the document file or the like which is intended to be printed, in the portable terminal 6 (part (d) of FIG. 8). Thereafter, the operator sets various print settings on the display panel 73 on which as information relating to the image formation, "color information 73a", "printed sheet number information 73b", "print side information 73c" and "sheet size information 73d" are displayed. After the settings are completed, when the operator presses shown a start button, a desired image is printed.

(Management System of user Information and Identification Information)

FIG. 10 is the authorized user list 800 managed in the storing portion 13 of the image forming apparatus 1. In the authorized user list 800, pieces of information on users who are allowed to use the image forming apparatus 1. Specifically, to a single user, user information (user ID and password) and identification information of the portable terminal 6 used when the user logs in the image forming apparatus 1. For example, to a user of No. 1, "111111" as the user ID (name) and "abab0101" as the password are assigned. The user ID (name) and the password are necessary pieces of information when the user logs in the image forming apparatus 1. The image forming apparatus 1. The image forming apparatus 1 performs user authentication on the basis of the inputted user ID (name) and the inputted password.

Further, the identification information of the portable terminal 6 used when this user logs in to the image forming apparatus 1 is "AAA . . . A4". In the authorized user list 800, the user name (ID) "111111" and the password "abab0101" are listed in association with the identification information "AAA . . . AA". In other words, the user name "111111" and the password "abab0101" are stored in the storing portion 13 in association with the identification information "AAA . . . A". Here, in this embodiment, the user information is the information containing the user name and the password, but may also be information representing the user name without containing the information on the password. Although described in detail layer, as regards the password, characters are inputted by a manual operation of the user, so that enhancement of security can be realized.

For example, when the user (No. 1) holds his/her 6 over the NFC tag portion 4, identification information thereof is transmitted from the portable terminal 6 to a wireless communication interface through the near field wireless communication. The CPU 7 checks whether or not identification information which is the same as the transmitted identification information (AAA . . . AA) is stored in the storing portion 13 while checking the identification information against the authorized user list 800. As a result, in the case where the identification information which is the same as the identification information (AAA . . . AA) of the portable terminal 6 held over the NFC tag portion 4 is in the authorized user list, the CPU 7 retrieves the user information (user ID: 111111, password: abab0101) registered in association with the identification information (AAA . . . AA) and performs the user authentication. That is, the CPU 7 authenticates use of the image forming apparatus by the user corresponding to the identification information on the basis of correspondence (association) between the identification information and the user information which have already been stored in the storing portion 13. By this, if the user only performs a holding operation of the portable terminal 6 over the NFC tag portion 6, it becomes possible to perform authentication of use of the image forming apparatus by the user, i.e., login of the user to the image forming apparatus 1.

The user ID and the password are necessary account information for using the image forming apparatus 1, and therefore, are required to be registered in the image forming apparatus 1 in advance. This information may be registered by each of users, but for example as in an office or the like, in the case where the image forming apparatus 1 is shared and used by a plurality of persons (users), an arbitrary administrator may also collectively register pieces of the account information as a representative. Even when the user separately registers the portable terminal 6, the user is capable of logging in to the image forming apparatus 1 by manually inputting the user ID and the password.

The identification information is the number such as the IMEI or the MED determined uniquely for each of the portable terminals 6 possessed by the users. In order to allow (permit) login of the user to the image forming apparatus 1 by using the portable terminal 6 as described above, the user is required to perform a registration operation (initial registration operation) such that the user separately registers the identification information of his/her portable terminal 6 in the image forming apparatus 1. As shown in FIG. 10, the identification information of the portable terminal 6 for a user of No. 3 is not registered in the image forming apparatus 1. For that reason, in the authorized user list 800, as regards the user of No. 3, the portable terminal identification information is not registered.

(Initial Registration of Identification Information in Conventional Type)

Next, a procedure when the user initially registers his/her portable terminal 6 in the image forming apparatus 1 of a conventional type. Part (a) of FIG. 11 is a schematic view for illustrating a conventional initial registration method. Part (a) of FIG. 11 shows a screen of the display panel 73 when an unregistered portable terminal 6 is held over the NFC tag portion 4. As shown in part (a) of FIG. 11, a guiding message 2000 to the effect that the identification information of the portable terminal 6 held over the NFC tag portion 4 is unregistered (in the storing portion) is displayed on the display panel 73.

Further, on the display panel 73, together with the guiding message 2000, a user ID input field 2001 and a password input field 2002 are displayed. The user inputs his/her user ID and his/her password to the user ID input field 2001 and the password input field 2002, respectively, by using hardware keys or the like provided so as to be adjacent to the display panel 73.

The CPU 7 discriminates whether or not the user ID inputted to the user ID input field 2001 and the password inputted to the password input field 2002 are present in the authorized user list 800. In the case where the CPU 7 discriminated that the user ID and the password are present in the authorized user list 800, the CPU 7 stores, in the storing portion 13, the identification information of the portable terminal 6 held over the NFC tag portion 4 in association with the inputted user ID and the inputted password.

However, in this method, there is a need that the user inputs his/her user ID and password to the user ID field 2001 and the password input field 2002, respectively, without erroneously inputting the user ID and the password word forward. In the case where the user erroneously inputs the user ID and/or the password, the user is required to input the user ID and/or the password again and thus it takes time and effort. further, there is a possibility that some user of the users does not accurately remember his/her user ID and password. Thus, it cannot be said that a method in which the user manually inputs the character strings is excellent in usability.

Part (b) of FIG. 11 is a schematic view for illustrating the display panel 73 on which software keys for inputting character strings are displayed. In the screen shown in part (a) of FIG. 11, when the user touches the user ID input field 2001, a cursor 2005 blinks in the user ID input field 2001.

By this, the user himself/herself can know that the user is capable of currently inputting the user ID in the user ID input field 2001.

In the conventional constitution shown in part (a) of FIG. 11, simultaneously with display of the cursor 2005, a software key portion 1134 is displayed on the display panel 73. The user may also input his/her user ID in the user ID field 2001 by using the software key portion 1134. Similarly, also the password input field 2002, input is performed by using the software key portion 1134. After the user ends the input of the user information to the user ID input field 2001 and the password input field 2002, the user presses down on OK button 2004 and logs in to the image forming apparatus 1. Incidentally, instead of the OK button 2004, by pressing an enter (return) button, the user can log in the image forming apparatus. When the inputted character is an error, the user is capable of deleting the inputted character and the character during the input by pressing on a cancel button 2003. The deletion of the character can also be carried out by the pressing down a delete button of the software key portion 1134. When the user presses down the cancel button 2003, all the characters in the input field during current input are deleted, and when the user presses down the delete button of the software key portion 1134, the user is capable of deleting the characters in the input field during current input one by one.

FIG. 12 is a flowchart showing a flow when the CPU 7 performs initial registration of the identification information of the portable terminal 6. Incidentally, this flowchart shows the flow of the conventional initial registration. This flow starts by holding the portable terminal 6 over the NFC tag portion 4 by the user. When the portable terminal 6 is held over the NFC tag portion 4, i.e., when the NFC tag portion 4 receives electromagnetic radiation (wave) radiated from the portable terminal 6, the CPU 7 discriminates that the NFC started (S1001).

When the NFC starts, the CPU 7 acquires the identification information from the portable terminal 6 through the NFC tag portion 4 (S1002).

Then, the CPU 7 makes reference to the authorized user list 800 in order to check whether or not the acquired identification information is present in the authorized user list 800 (S1003). In the case where the CPU 7 finds the identification information identical to the acquired identification information in the authorized user list 800, the CPU 7 performs response to login allowance to the portable terminal 6 through the NFC (S1004). The CPU 7 executes login by using the user ID and the password which correspond to the identification information similar to the acquired identification information. This flowchart ends by the login of the user to the image forming apparatus 1 (S1014).

On the other hand, in the case where in S1003, the CPU 7 discriminated that the acquired identification information is not present in the authorized user list 800, the step goes to S1005. In S1005, the CPU 7 sends a signal for requiring registration of the portable terminal 6. In response thereto, for example, the display panel 73 displays the user ID input field 2001 and the password input field 2002 as shown in part (a) of FIG. 11 (S1006). The user inputs his/her user ID and password to the user ID input field 2001 and the password input field 2002, respectively, which are displayed on the display panel 73. In response to the input of the character string with the software key portion 1134 or the like by the user, the user provides an instruction to the display panel 73 so that the character strings inputted by the user are successively displayed in the user ID input field 2001 and the password input field 2002 (S1007). That is, a period in which the CPU 7 performs the process in S1007 is a period from a start of the input of the character string by the user until the user presses down the OK button 2004.

In response to the pressing-down of the OK button 2004 by the user, the CPU 7 makes reference to the authorized user list 800 managed by the storing portion 13 and discriminates whether or not the inputted user ID is present in the storing portion 13 (S1008).

Here, in the case where the user ID is not present in the authorized user list 800, i.e., in the case where the user ID is not present in the storing portion 13, the CPU 7 causes the display panel 73 to display an "unregistered account screen (not shown)". This means that a user who does not possess an account of the image forming apparatus 1 tried to log in to the image forming apparatus 1. The CPU 7 causes the display panel 73 to display the "unregistered account screen (not shown)" and then ends the process.

In the case where the CPU 7 discriminated that the user ID is present in the authorized user list 800, the step goes to S1010. S1010 is a step for discriminating whether or not the password inputted by the user and the password corresponding to the above-described user ID coincide with each other.

Here, in the case where the CPU 7 discriminated that the inputted password and the password managed in the storing portion 13 "do not coincide with each other", the CPU 7 causes the display panel 73 to display an "input error (mistaken entry) notification screen". The "input error notification screen" is a screen for notifying the user that the inputted password is an error. The CPU 7 ends the process after causing the display panel 73 to display the "input error notification screen".

On the other hand, in S1010, in the case where the CPU 7 discriminated that the inputted password and the password managed in the storing portion 13 "coincide with each other", the CPU 7 causes the storing portion 13 to store the identification information. At this time, the CPU 7 causes the storing portion 13 to store the identification information in association with the user ID and the password (S1012). Thus, registration of the identification information in association with the user ID and the password is completed.

After, the registration of the identification information is completed, the CPU 7 causes the display panel 73 to display a "portable terminal registration completion screen" (S1013). Then, the CPU 7 allows login of the user by using the inputted user ID and the inputted password (S1014) and ends the process.

As described above, conventionally, in the case where an unregistered portable terminal 6 is held over the NFC tag portion 4, there was need to manually input the character string such as the user ID by the user. In the case where the user ID is long or is complicated, there is a high possibility of erroneous input, so that the user was forced to perform a troublesome operation.

On the other hand, in the present invention, the unregistered portable terminal 6 can be registered by a simpler method.

(Initial Registration of Identification Information in the Present Invention)

Parts (a) to (d) of FIG. 13 are schematic views for illustrating an initial registration screen of the identification information in the present invention. Part (a) of FIG. 13 is a screen of the display panel 73 when the image forming apparatus 1 is in a stand-by state. The image forming apparatus 1 in this embodiment is capable of being in the stand-by state and a sleep state. When the image forming apparatus 1 is in the sleep state, electric power is not supplied to the image forming portion 158, the image reading apparatus 152 and the display panel 73. The stand-by state is, for example, the case where a human sensor 160 detects a human or the like case. In the stand-by state, although the electric power is not supplied to the image forming portion 158 and the image reading apparatus 152, the electric power is supplied to the display panel 73. At this time, the CPU 7 causes the display panel 73 to display an "NFC touch screen" shown in part (a) of FIG. 13. In the "NFC touch screen", a touch mark 3010 is displayed in the neighborhood of a center of the display panel 73. The operating portion 2 is provided with an unshown loop coil 23, and the user holds the portable terminal 6 over the touch mark 3010 as a target, so that near field wireless communication between the portable terminal6 and the image forming apparatus 1 is started.

Further, as shown in part (a) of FIG. 13, an "edit mark 927" is displayed on the "NFC touch screen". The user is capable of editing correspondence of the user ID and the password with the identification information by touching the edit mark 927. An editing method will be described later.

Part (b) of FIG. 13 is a screen of the display panel 73 when the unregistered portable terminal 6 is held over the NFC tag portion 4. As shown in part (b) of FIG. 13, on the display panel 73, a guiding message 3000 to the effect that the portable terminal 6 held over the NFC tag portion 4 is an unregistered one is displayed.

Further, on the display panel 73, together with the guiding message 3000, a "user ID input field 921", a "password input field 924" and an "icon mark field 922" are displayed. In the icon mark field 922, a list of user IDs present in the authorized user list 800 are displayed together with icon marks (an example of icons) 922-1 to 922-8. The icon marks 922-1 to 922-8 are displayed together with the user IDs. These icon marks 922-1 to 922-8 are an example of items corresponding to the respective user IDs. In this embodiment, the icon marks 922-1 to 922-8 are displayed for 8 persons at the maximum in one screen. Thus, the icon marks 922-1 to 922-8 are displayed on the display panel 73 by the CPU 7 so as to be selectable. It is possible to display different icon marks by pressing down an arrow mark 923 or by swiping the screen. The icon marks 922-1 to 922-8 in this embodiment have human patterns (figures), but this embodiment is not limited to these patterns. For example, the user may also set an icon or an image in a shape as the user himself/herself desires.

In this embodiment, in response to the holding of the unregistered portable terminal 6 over the NFC tag portion 4 by the user, the display panel 73 displays the screen shown in part (b) of FIG. 13, but a cursor 3005 has already blinked in the user ID input field 921. In this state, when the user touches either one of the icon marks 922-1 to 922-8, the user ID corresponding to the touched icon mark is automatically inputted to the user ID input field 921. In a state in which the cursor 3005 is displayed in the user ID input field 921 and in a state in which the user ID has already been inputted to the user ID input field 921, when a cancel mark 925 is touched by the user, the inputted ID is deleted. Further, in the state in which the cursor 3005 is displayed in the user ID input field 921 and in a state in which the user ID has not been inputted yet, when the cancel mark 925 is touched by the user, the display panel 73 ends display of the initial registration screen.

Incidentally, in the case where the edit mark 927 is touched by the user on the "NFC touch screen", the guiding message 3000 changes in contents to a different message. Instead of the content shown in part (b) of FIG. 13, for example, a message such that "Register user information and then hold portable terminal over screen" or "Input user ID and password and then hold portable terminal over screen" is displayed. In the case where the edit mark 927 is touched, an OK mark 926 is also in a non-display state. The user holds his/her portable terminal 6 over the NFC tag portion 4 and then selects an associated icon mark. By this, for example, a third person who receives the portable terminal 6 from the user who has already registered his/her user information and his/her identification information is capable of performing initial registration in which his/her portable terminal 6 is associated with his/her user information.

Part (c) of FIG. 13 is a schematic view for illustrating a state in which the icon mark 922-3 is touched by the user and then the user ID "333333" corresponding to the icon mark 922-3 is automatically inputted to the user ID input field 921. In this state, the user inputs the password in the password input field 924 and then presses down the OK mark 926, so that the user is capable of registering the identification information of the portable terminal 6.

Incidentally, in this embodiment, the user IDs are displayed together with the icon marks 922-1 to 922-8, but the input displayed is not limited to the user ID. For example, a user name corresponding to the displayed user ID may also be displayed. Thus, even a user who does not remember his/her user ID is capable of easily select his/her icon mark. Even in this case, in response to selection of an arbitrary icon mark by the user, the user ID corresponding to the selected icon mark is inputted to the user ID field.

As described above, in response to the holding of the portable terminal 6 over the NFC tag portion 4 by the user, the CPU 7 causes the display panel 73 to display the icon marks 922-1 to 922-8 corresponding to the user IDs registered in the authorized user list 800. The user is not required to manually input the user ID and is capable of inputting the user ID by selecting the icon mark corresponding to his/her user ID. For that reason, even when a long user ID is used, input of the user ID is completed with one touch, and therefore, the operation is simple compared with a conventional operation. Further, even in the case where a memory of his/her user ID is vague, the user ID is actually displayed, and therefore, it is possible to reduce a degree of erroneous input. Further, when the icon marks 922-1 to 922-8 themselves are set at marks by which individuals can be identified, there is no need to originally store his/her user ID.

In the conventional initial registration screen, an operation of touching the input field and an operation in which the software key portion 1134 is displayed and touched are needed, and thus were complicated. In comparison thereto, the operations in the screens shown in part (b) and (c) of FIG. 13 which are features of the present invention are simple operations such that the user selects his/her icon mark. Thus, the initial registration screen in the present invention is excellent in usability when compared with the conventional initial registration screen.

Here, the user selects his/her icon mark from the icon marks 922-1 to 922-8, and in addition, needs to input his/her press to the password input field 924. By doing so, it is possible to prevent spoofing by a third person. However, for example, in consideration of use in an environment, such as an office, in which the spoofing does not readily occur, a constitution in which the input of the password is omitted may also be employed. Specifically, not only the information on the user ID but also the information on the password are associated with the icon mark in advance. By this, it is possible to realize a constitution in which in response to selection of his/her icon mark of the user, in addition to the user ID, the password is automatically inputted. The user is not required to take the trouble to input his/her user ID and password. Thus, any of (1) a constitution in which the user ID is automatically inputted but the password is inputted by the user, and (2) a constitution in which both the user ID and the password are automatically inputted may be employed. In the case where the constitution of the above (1) is employed, compared with the constitution of the above (2), there is an advantage that time and effort of the operation are reduced. On the other hand, in the case where the constitution of the above (2) is employed, compared with the constitution of the above (1), there is an advantage that a security level is improved.

Part (d) of FIG. 13 is a screen for notifying the user that the identification information of the portable terminal 6 was registered. When the user checks the input of the user ID and the password and presses down the OK button 926, the CPU 7 causes the storing portion 13 to store the identification information in association with the inputted user ID and the inputted password. In response to the storing of the identification information in the storing portion 13, the CPU 7 causes the display panel 73 to display that registration of the portable terminal 6 is completed (portable terminal registration completion screen). On this screen, the user ID and the identification information are displayed, and the user checks that these pieces of information are his/her pieces of information and then presses down the OK button 931. When the OK button 931 is pressed down, the display panel 73 ends the display of the "portable terminal registration completion screen".

Next, by using FIG. 14, a flow in which in the case where the unregistered portable terminal 6 is held over the NFC tag portion 4, the CPU 7 causes the display panel 73 to display the icon mark will be described. A flowchart obtained by replacing a portion enclosed by a broken line W in the flowchart of FIG. 12 showing the conventional constitution with a flowchart of FIG. 14 is flowchart showing a constitution of the present invention. That is, in FIG. 12, a portion other than the portion enclosed by the broken line W is similar to the portion of the conventional constitution. In FIG. 14, a "START" corresponds to the time when S1005 (FIG. 12) which is the step of requiring the registration by the CPU 7 is completed. Further, the "END" represents the time when the OK button 926 is pressed down. Incidentally, the OK button 926 may also be a constitution regarded as being pressed down automatically in response to the completion of input of the user ID and the password to the user ID input field 921 and the password input field 924, respectively.

In response to completion of a step of S1500 by the CPU 7, the CPU 7 causes the display panel 73 to display the icon mark display screen 92. Here, the "icon mark display screen" refers to the screen shown in part (b) of FIG. 13.

In a subsequent step of S1015, the CPU 7 detects whether or not the display panel 73 is touched by the user. In the case where the touch is not detected by the CPU 7, the CPU 7 ends the process. Here, the case where the touch is not detected by the CPU 7 refers to, for example, the case where a predetermined time has elapsed from the display of the icon mark display screen. Specifically, in the case of this embodiment, when 10 sec has elapsed since the CPU 7 causes the display panel 73 to display the icon mark display screen, the CPU 7 ends the process. That is, the CPU 7 performs an operation which is the same as the operation in the case where the OK button 926 is pressed down in a state in which the user ID and the password have not been inputted. The CPU 7 calculates a time elapsed from which the icon mark display screen is displayed on the display panel 73, and ends the process when the elapsed time reaches a predetermined time.

In the case where the CPU 7 detects that the user touches the display panel 73, the CPU 7 causes the step of the process to go to S1016. In S1016, the CPU 7 discriminates whether or not the portion touched on the display panel 73 is the icon mark. Here, in the case where a portion other than the icon mark, the user is regarded as that the user has no intention to touch the icon mark, so that the CPU 7 ends the process. Incidentally, for example, when the CPU 7 discriminated that the touched portion is the user ID input field 921, the CPU 7 may also cause the display panel 73 to display the software key input portion 1134. In the case where the software key input portion 1134 is displayed, the CPU 7 ends the process in response to completion of the user ID and the password.

In S1016, in the case where the CPU 7 discriminated that the icon mark is touched, the user ID corresponding to the touched icon mark is overwritten in the user ID input field 921, and the password corresponding to the touch icon mark is overwritten in the password input field 924 (S1017). The CPU 7 ends the process in response to the input of the user ID and the password. That is, the CPU 7 progresses the process by regarding the process as that the OK button 926 is pressed down in a state in which the user ID and the password are overwritten in the respective input fields.

Modified Embodiment 1

In the above-described embodiment, the CPU 7 causes the display panel 73 to display the icon mark display screen in response to the holding of the unregistered portable terminal 6 over the NFC tag portion 4, but the screen displayed on the display panel 73 may also be a user list 93 as shown in parts (a) and (b) of FIG. 15. The user list 93 is a list of persons allowed to use the image forming apparatus 1 and is a list constituted by three columns of "No.", "USER ID" and "PASSWORD". The user seeks his/her user ID from the user list 93 instead of the icon marks displayed in the icon marks 922, and then touches the associated item. Part (b) of FIG. 15 is a screen showing a state in which the item of the user ID "222222" is touched and selected by the user. In this case, the user ID "222222" is inputted to the user ID input field 921, and a corresponding password is automatically inputted to the password input field 924. Thus, even by a method in which the list of user IDs of persons allowed to use the image forming apparatus 1 is displayed and then the user is caused to select his/her user ID from the list, there is no need that the user manually inputs the character string, so that it is possible to input the user ID and the password by a simple operation when compared with the conventional constitution.

Modified Embodiment 2

Further, a user list 94 in which user names are displayed instead of numerals in the columns of "No." in the user list 93 described in the modified embodiment 1 may also be displayed. The user list 94 shown in part (c) of FIG. 15 is a list constituted by three columns of "NAME", "USER ID" and "PASSWORD". The user seeks his/her name from the user list 94 and then touches the associated item. Part (d) of FIG. 15 is a screen showing a state in which the item of the user ID "222222" is touched and selected by the user. In this case, the user ID "222222" is inputted to the user ID input field 921, and a corresponding password is automatically inputted to the password input field 924. Thus, even by a method in which the list of user IDs of persons allowed to use the image forming apparatus 1 is displayed and then the user is caused to select his/her user ID from the list, there is no need that the user manually inputs the character string, so that it is possible to input the user ID and the password by a simple operation when compared with the conventional constitution. Further, in actuality, the user name himself/herself is displayed, and therefore, even a person whole forgets his/her user ID can easily know his/her user ID.

Modified Embodiment 3

In the above, a constitution in which user information of a certain (one) person selected from users of a plurality of pieces of user information stored in the storing portion 13 and identification information of a single unregistered portable terminal 6 held over the NFC tag portion 4 are associated with each other and are stored in the storing portion 13 was described. In a mode field embodiment 3, a constitution in which a plurality of pieces of user information are associated with identification information of a single portable terminal 6 in the storing portion 13 will be described.

On the scene such as an office, it would be considered that tablet terminals are distributed on an organization basis such as a section (division). The tablet terminal referred to herein is a portable terminal 6 corresponding to the portable terminal 6 described above. For example, a situation such that an organization A constituted by three employees A, B and C and an organization B constituted by four employees D, E, F and G exist would be considered. In such a situation, the employees A, B and C log in the image forming apparatus 1 by using the tablet terminal A, and the employees D, E, F and G log in the image forming apparatus 1 by using the terminal tablet B. In this case, there is a need that pieces of user information of the respective employees A to C are stored in the storing portion 13 in association with the identification information of the tablet terminal A and that pieces of user information of the respective employees D to G are stored in the storing portion 13 in association with the identification information of the tablet terminal B.

Parts (a) to (c) of FIG. 16 are schematic views for illustrating a constitution for storing the single identification information in association with the plurality of pieces of user information in the storing portion 13 by the CPU 7. The user is capable of selecting a plurality of icon marks from a plurality of icon marks 922-1 to 922-8 displayed on the display panel 73.

Part (a) of FIG. 16 is a screen of the display panel 73 when an unregistered portable terminal 6 is held over the NFC tag portion 4. Incidentally, constituent elements similar to the above-described constituent elements are represented by the same reference numbers or symbols. As shown in part (a) of FIG. 16, the display panel 73 is capable of displaying a "plural user registration button 3030" for registering a plurality of users in association with a single piece of identification information.

In the case where it is intended that a plurality of pieces of user information are stored in the storing portion 13 in association with a certain (one) piece of identification information, the user holds an unregistered portable terminal 6 over the NFC tag portion 4 and then presses down the plural user registration button 3030.

Part (b) of FIG. 16 shows a state in which a plurality of icon marks (922-3, and 922-4 in this example) are selected by the user. At first, the user presses down the plural user registration button 3030, so that the user is then capable of selecting the plurality of icon marks. As in the example shown in part (b) of FIG. 16, in response to selection of the icon marks 922-3 and 922-4, "33333" and "44444" are inputted to the user ID input field 921. Thereafter, the user inputs his/her password to the password input field 924 and then presses down the OK button 926.

Part (c) of FIG. 16 is a screen for notifying the user that the identification information of the portable terminal 6 has been registered in association with a user ID "33333" and a user 2D "44444". As shown by a message 3031, it is understood that a certain piece of identification information has been registered in association with users 33333 and 44444.

From the above, even in the case where the portable terminal 6 such as the tablet terminal common to two persons of the users 33333 and 44444 is possessed by the two persons, each of the users is capable of logging in to the image forming apparatus 1 by using the same tablet terminal.

Embodiment 2

In the embodiment 1, the constitution in which the CPU 7 causes the storing portion 13 to store the identification information of the portable terminal 6 in association with the user information. On the other hand, in an embodiment 2, the CPU 7 causes the storing portion 13 to store biological information of a user in association with user information. An authentication element is roughly divided into three elements consisting of "knowledge information", "possession information" and "biological information". The "knowledge information" is information known only by a person himself/herself, and for example, is the user 2D and the password. The "possession information" is, for example, a hardware such as an ID card or a smartphone which is possessed only by the person himself/herself. The "biological information" is information or characteristic, which is possessed by the person himself/herself and which is intrinsic to a living thing, and for example, a face, an iris, a finger print, a vein, and the like. In an image forming apparatus 111 of the embodiment 2, the user is subjected to authentication by using the "biological information".

FIG. 17 is a schematic view of the image forming apparatus 111 of the embodiment 2. The image forming apparatus 111 is different from the image forming apparatus 1 described in the embodiment 1 and is provided with a biological information authentication portion 3020. As the biological information authentication portion 3020, a camera, a finger print sensor or the like would be considered. Incidentally, constituent elements of the image forming apparatus 111 other than the biological information authentication portion 3020 are the same as those of the image forming apparatus 1 of the embodiment 1.

For example, the case where the biological information authentication portion 3020 is capable of authenticating the face of the user will be described. The user images his/her face by the camera which is the biological information authentication portion 3020. Here, in the storing portion 13, face images of users allowed to use the image forming apparatus 111 are stored in association with pieces of user information. Accordingly, the CPU 7 compares the imaged face image with the face images stored in advance in the storing portion 13, and in the case where the compared from images coincide with each other, the CPU 7 makes reference to the user information managed in association with the face image and then allows the user to log in to the image forming apparatus 111. Thus, the biological information authentication portion 3020 and the CPU 7 functions as a biological information acquiring means.

Also as regards this biological information, similar to the identification information described in the embodiment 1, the initial registration is needed. When the user who is not registered in the storing portion 13 tried to log in to the image forming apparatus 111, the "icon mark display screen" of FIG. 13 described in the embodiment 1 is displayed on the display panel 73. At this time, as the guiding message 3000, a message such as "Biological information of this user is unregistered. Register user information." is displayed. Thus, the user is notified of information to the effect that the biological information is unregistered and that a new registration is possible.

In the following, registration in which the biological information and the user information are associated with each other along a flow similar to the initial registration described in the embodiment 1.

Further, in the case of a constitution in which the biological information authentication portion 3020 authenticates the iris of the user, the user images his/her eye(s) by the camera. The CPU 7 performs user authentication by using information on the iris as the biological information. As another method, when the biological information authentication portion 3020 is the finger print sensor, it is possible to authenticate the user by using information on the finger print of the user, and when the biological information authentication portion 3020 is a vein sensor, it is possible to authenticate the user by using information on a vein of a finger of the user.

As described above, the information associated with the user information may also be the identification information of the portable terminal 6 or the biological information of the user. Even as regards either information, by employing a characteristic constitution such that the "icon mark display screen" is displayed, the user is capable of performing the initial registration of the identification information or the biological information without requiring a complicated operation by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-194810 filed on Oct. 25, 2019, which is hereby incorporated by reference herein in its entirety.

What is claimed is:

1. An image forming apparatus capable of setting a mode in which use of said image forming apparatus including formation of an image on a sheet is allowed to a user by authenticating said user, said image forming apparatus comprising:

a storing unit configured to store pieces of identification information assigned to portable terminals, respectively, and pieces of user information assigned to users, respectively, in association with each other;

an acquiring unit configured to acquire the pieces of identification information assigned to said portable terminals to identify said portable terminals individually through an antenna configured to receive information by near field wireless communication from an associated one of said portable terminals positioned within a predetermined distance from said antenna; and a control unit, wherein (1) on the basis of association between the pieces of identification information stored in said storing unit and the pieces of user information, said control unit authenticates the use of said image forming apparatus by said user corresponding to an associated piece of identification information of a portable terminal, and (2) upon acquisition by said acquiring unit, of a piece of identification information of the portable terminal which is not stored in said storing unit associated with the pieces of user information assigned to said user, said controller unit causes a display portion to display display regions corresponding to the pieces of user information associated with said user so as to be selectable to input the pieces of user information and the identification information of the portable terminal by said user and to cause said storing unit to store the inputted piece of identification information of the portable terminal and a corresponding pieces of user information in association with each other.

2. An image forming apparatus according to claim 1, wherein said storing unit is capable of storing single identification information and the pieces of user information in association with each other, and wherein for acquisition by said acquiring unit, of a piece of identification information of the portable terminal which is not stored in said storing user, said control unit causes the display portion to display display regions corresponding to the pieces of user information so as to be selectable to cause said storing user to store the piece of identification information of the portable terminal and the pieces of user information stored in said storing user in association with each other.

3. An information according to claim 1, wherein said display regions corresponding to the pieces of user information include icons representing said users, respectively.

4. An image forming apparatus according to claim 1, wherein said display regions corresponding to the pieces of user information include user names of said users, respectively.

5. An image forming apparatus according to claim 1, wherein said display regions corresponding to the pieces of user information includes user IDs of said users, respectively.

6. An image forming apparatus according to claim 1, wherein said user allowed to use said image forming apparatus by authentication is capable of setting a printing condition of a sheet, and said control unit causes aid display panel to display the printing condition corresponding to said user.

7. An image forming apparatus according to claim 1, wherein said display panel is a touch panel configured to receive a touch operation by said user.

* * * * *